US010726979B2

(12) United States Patent
Liu

(10) Patent No.: US 10,726,979 B2
(45) Date of Patent: Jul. 28, 2020

(54) BULK NANOCOMPOSITE MAGNETS AND METHODS OF MAKING BULK NANOCOMPOSITE MAGNETS

(71) Applicant: Board of Regents, The University of Texas System, Austin, TX (US)

(72) Inventor: J. Ping Liu, Colleyville, TX (US)

(73) Assignee: Board of Regents, The University of Texas System, Austin, TX (US)

(*) Notice: Subject to any disclaimer, the term of this patent is extended or adjusted under 35 U.S.C. 154(b) by 764 days.

(21) Appl. No.: 14/989,862

(22) Filed: Jan. 7, 2016

(65) Prior Publication Data

US 2016/0196905 A1 Jul. 7, 2016

Related U.S. Application Data

(60) Division of application No. 12/968,999, filed on Dec. 15, 2010, now Pat. No. 9,242,295, which is a
(Continued)

(51) Int. Cl.
| | |
|---|---|
| *H01F 1/055* | (2006.01) |
| *B22F 1/00* | (2006.01) |
| *B22F 9/04* | (2006.01) |
| *B82Y 25/00* | (2011.01) |
| *B82Y 30/00* | (2011.01) |

(Continued)

(52) U.S. Cl.
CPC .......... *H01F 1/0556* (2013.01); *B22F 1/0003* (2013.01); *B22F 1/0018* (2013.01); *B22F 1/0025* (2013.01); *B22F 9/04* (2013.01); *B82Y 25/00* (2013.01); *B82Y 30/00* (2013.01); *C22C 1/0441* (2013.01); *C22C 28/00* (2013.01); *H01F 1/0557* (2013.01); *H01F 1/0579* (2013.01); *H01F 1/14* (2013.01); *H01F 41/0266* (2013.01); *B22F 2009/041* (2013.01); *B22F 2009/043* (2013.01); *B22F 2301/355* (2013.01); *B22F 2301/45* (2013.01); *B22F 2304/05* (2013.01); *B22F 2998/10* (2013.01); *C22C 2202/02* (2013.01)

(58) Field of Classification Search
CPC ....... H01F 1/055; H01F 1/0556; B22F 1/0025
USPC .......................................................... 419/19
See application file for complete search history.

(56) References Cited

U.S. PATENT DOCUMENTS

| | | | |
|---|---|---|---|
| 3,215,572 | A | 11/1965 | Papell |
| 3,917,538 | A | 11/1975 | Rosensweig |

(Continued)

FOREIGN PATENT DOCUMENTS

| | | |
|---|---|---|
| JP | 1029428 | 11/1998 |
| JP | 2005298857 | 10/2005 |

(Continued)

OTHER PUBLICATIONS

Chen, K. H., et al., "Bulk nanocomposite magnets produced by dynamic shock compaction", Journal of Applied Physics (2004),96: 1276-1278.

(Continued)

*Primary Examiner* — Weiping Zhu
(74) *Attorney, Agent, or Firm* — Christopher S. Dodson; Nexsen Pruet, PLLC

(57) ABSTRACT

The present invention relates to bulk magnetic nanocomposites and methods of making bulk magnetic nanocomposites.

16 Claims, 38 Drawing Sheets

Related U.S. Application Data continuation-in-part of application No. 12/341,656, filed on Dec. 22, 2008.

(60) Provisional application No. 61/287,141, filed on Dec. 16, 2009, provisional application No. 61/016,353, filed on Dec. 21, 2007.

(51) Int. Cl.
*C22C 1/04* (2006.01)
*H01F 1/057* (2006.01)
*H01F 41/02* (2006.01)
*C22C 28/00* (2006.01)
*H01F 1/14* (2006.01)

(56) References Cited

U.S. PATENT DOCUMENTS

| | | | |
|---|---|---|---|
| 5,145,684 | A | 9/1992 | Liversidge et al. |
| 5,147,573 | A | 9/1992 | Chagnon |
| 5,510,118 | A | 4/1996 | Bosch et al. |
| 6,401,799 | B1 | 6/2002 | Arai et al. |
| 6,425,961 | B1 | 7/2002 | Kojima et al. |
| 6,752,979 | B1 | 6/2004 | Talbot et al. |
| 6,972,046 | B2 | 12/2005 | Sun et al. |
| 6,979,374 | B2 | 12/2005 | Arai et al. |
| 7,144,463 | B2 | 12/2006 | Chen et al. |
| 2002/0003179 | A1 | 1/2002 | Verhoff et al. |
| 2002/0039594 | A1 | 4/2002 | Unger |
| 2002/0179185 | A1 | 12/2002 | Billiet et al. |
| 2006/0005898 | A1* | 1/2006 | Liu ............... B82Y 25/00 148/105 |
| 2007/0036026 | A1 | 2/2007 | Laibinis et al. |
| 2008/0260941 | A1 | 10/2008 | Jin |
| 2010/0054981 | A1 | 3/2010 | Liu |

FOREIGN PATENT DOCUMENTS

| | | |
|---|---|---|
| WO | 2006113354 | 10/2006 |
| WO | 2007069262 | 6/2007 |

OTHER PUBLICATIONS

Choi, Y. et al., "Element-specific recoil loops in Sm—Co/Fe exchange-spring magnets", J. Applied Phys. (2008), 103:07E132-1-07E132-3.
Elkins, K. et al., "A novel approach to synthesis of FePt magnetic nanoparticles", Journal of Nano Research, (2008), 1: 23-29.
Elkins, K. et al., "Monodisperse face-centred tetragonal FePt nanoparticles with giant coercivity", Journal of Physics D: Applied Physics, (2005),38: 2306-2309.
Elkins, K. et al., "Ultrafine FePt nanoparticles prepared by the chemical reduction method", Nano Letters,(2003),3:12: 1647-1649.
Guo, Z. J., et al., "Exchange-coupled Sm—Co/Nd—Co nanomagnets: correlation between soft phase anisotropy and exchange field", Applied Physics Letters, (2002),81(11):2029-2031.
Gutfleisch, 0. "Preparation methods for bulk materials", European School on Magnetism: New Experimental Approaches in Magnetism, Constanta, (2005), 1-7.
Hou, Yanglong et al., "A facile synthesis of SmCo5 magnets for core/shell Co/Sm2O3 nanoparticles", Advanced Materials, (2007),19: 3349-3352.
Nandwana, V. et al., "Size and shape control of monodisperse FePt nanoparticles", J. Phys. Chem. C. (2007), 111: 4185-4189.
Rong, C. et al., "Bulk FePt-based nanocomposite magnets with enhanced exchange coupling", J. Applied Physics (2007), 102: 023908-1-023908-7.
Rong, C. et al., "High-thermal stability of carbon-coated L10-FePt nanoparticles prepared by salt-matrix annealing", J. Appl. Phys., (2008),103: 07E131-1-07E131-3.
Rong, C. et al., "Size-dependent chemical and magnetic ordering in L10 FePt nanoparticles", Advanced Materials, (2006), 18: 2984-2988.
Shan, Z. S., et al., "Energy Barrier and Magnetic Properties of Exchange-Coupled Hard-Soft Bilayer", IEEE Transactions on Magnetics, (2002),38(5): 2907-2909.
Shokrollahi, H. et al., "Effect of warm compaction on the magnetic and electrical properties of Fe-based soft magnetic composits", Journal of Magnetism and Magnetic Materials (2007),313: 1: 182-186.
Sun, S. "Recent advances in chemical synthesis, self-assembly, and applications of FePt nanoparticles", Advanced Materials, (2006), 18: 393-403.
Swygenhoven, H. V., et al., "Deformation in nanocrystalline metals", Materials today (2006),9:5: 24-31.
Wang, Y. et al., "Sm—Co hard magnetic nanoparticles prepared by surfactant-assisted ball milling", Nanotechnology (2007), 18:465701: 1-4.
Wei, Qiu et al., "Crystal structure and compressibility of FePt nanoparticles under high pressures and high temperatures", High Pressure Research, (2004),24:3: 357-364.
Yano, K. et al., "Rapid thermal annealing of FePt nanoparticles", J. Applied Physics (1998),104: 013918-1-013918-4.
Yoon, D. Y., et al., "Densification mechanism of warm compaction for iron-based powder materials", Material Science Forum, (2007),534-536: 261-264.
Zeng, H. et al., "Tailoring magnetic properties of core/shell nanoparticles", Applied Physics Letters (2004),85:5: 792-794.

* cited by examiner

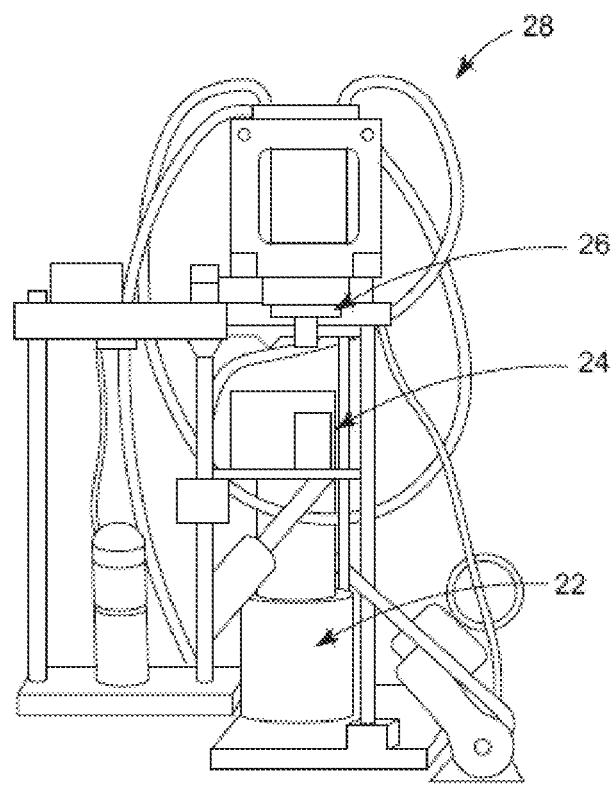
FIG. 3
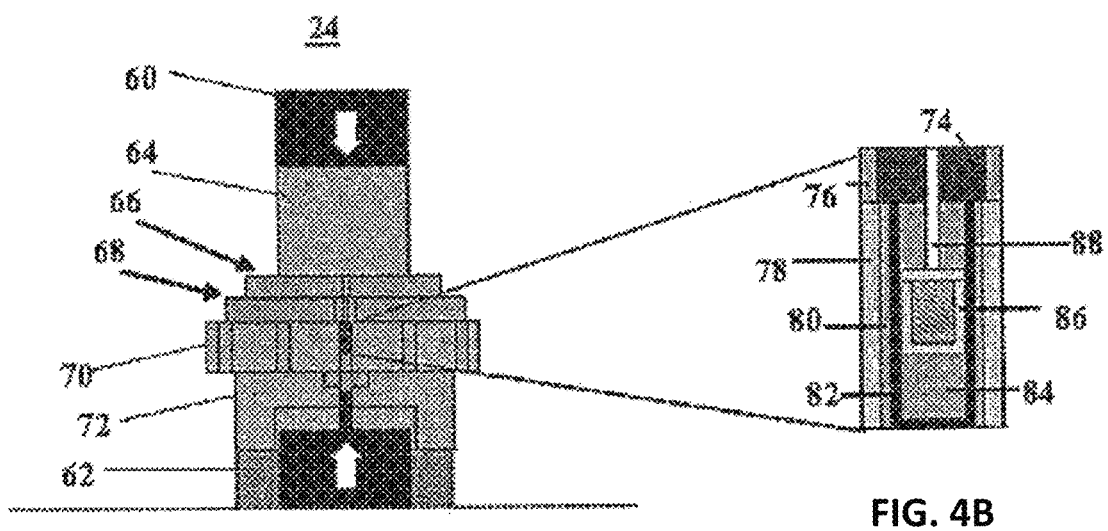
FIG. 4A
FIG. 4B

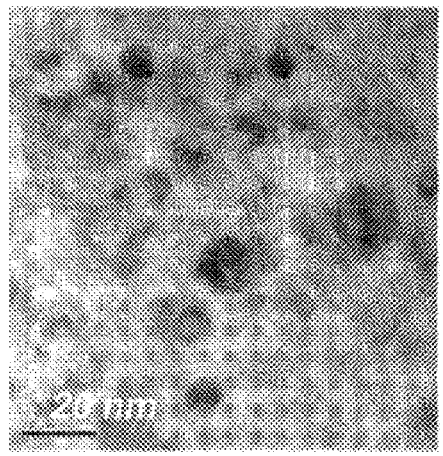 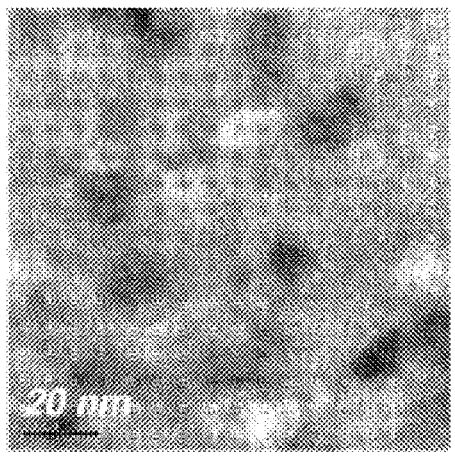
FIG. 16A              FIG. 16B
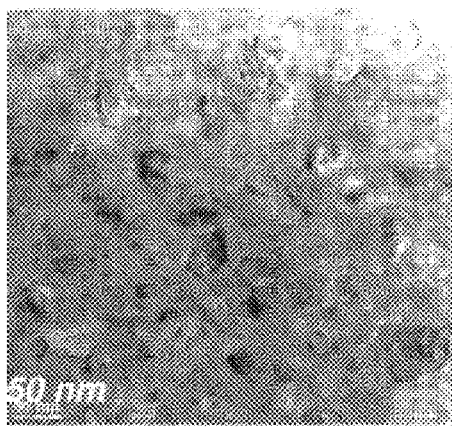
FIG. 16C

BULK NANOCOMPOSITE MAGNETS AND METHODS OF MAKING BULK NANOCOMPOSITE MAGNETS

CROSS REFERENCE TO RELATED APPLICATIONS

This application is a divisional application of U.S. patent application Ser. No. 12/968,999, filed Dec. 15, 2010, which claims benefit of U.S. Provisional Application No. 61/287,141, filed Dec. 16, 2009, and which is a continuation-in-part of U.S. patent application Ser. No. 12/341,656, filed Dec. 22, 2008, which claims the benefit of U.S. Provisional Application No. 61/016,353, filed Dec. 21, 2007, the entire disclosures of which are incorporated by reference.

STATEMENT REGARDING FEDERALLY SPONSORED RESEARCH

This invention was made with government support under Grant No. N00014-05-1-0497 awarded by the Office of Naval Research/MURI Project and DARPA/ARO Grant W911NF-08-1-0249. The government has certain rights to this invention.

FIELD OF INVENTION

The present invention relates to the field of permanent magnets, especially nanoscale composite magnets.

BACKGROUND

Despite tremendous effort in the field, no single compound or alloy has yet been discovered which possesses all of the desired characteristics for an ideal permanent magnet. Desirable characteristics include high magnetization, high Curie temperature, high magnetocrystalline anisotropy, and low cost. Samarium-cobalt intermetallic compounds (including $SmCo_5$, $Sm_2Co_7$, and $Sm_2Co_{17}$) have the highest magnetocrystalline anisotropy (up to $10^7$ erg/cm$^3$) and the highest Curie temperatures (up to 1190K) among all hard magnetic phases discovered to date. However, currently available Sm—Co based magnets have relatively low saturation magnetization ($M_s$) compared to Nd—Fe based magnets, which has restricted their utilization in high power density applications such as wind power turbines and the electric motors in hybrid vehicles. But Nd—Fe based magnets are not ideal for high power density applications either. Because Nd—Fe based magnets have considerably lower Curie temperatures (580K), their use in high power density applications requires cooling, thus reducing the overall system efficiency. It is therefore desirable to provide a new type of permanent magnet that can function in high power density applications at high operating temperatures without cooling.

One metric for measuring a magnetic material's usefulness as a permanent magnet in some applications is the so called energy product, which is the maximum value of B times H that can be obtained from a given demagnetization curve (or demagnetizing quadrant in a hysteresis curve), where B is magnetic induction and H is magnetic field strength. The energy product can thus be denoted as $(BH)_{max}$. For many applications, including high power density applications, it is desirable to provide magnets having a high energy product. Assuming a constant coercivity, increasing a material's saturation magnetization increases the material's energy product as well.

SUMMARY OF THE INVENTION

The present invention relates to bulk magnetic nanocomposites and methods of making bulk magnetic nanocomposites (also sometimes called "bulk nanocomposite magnets"). In one aspect, the present invention relates to bulk magnetic nanocomposites that comprise a matrix comprising at least one hard magnetic component and a plurality of particles comprising at least one soft magnetic component, wherein the plurality of particles comprising at least one soft magnetic component are distributed in the matrix comprising at least one hard magnetic component. In another aspect, the present invention relates to methods of making a bulk magnetic nanocomposite that comprise providing a first powder comprising at least one hard magnetic component; providing a second powder comprising at least one soft magnetic component; combining said first and second powders to form a mixture; processing said mixture to form a processed mixture wherein at least some deformation of said mixture has occurred; and warm compacting said processed mixture to form a bulk magnetic nanocomposite. In yet another aspect, the present invention relates to bulk magnetic nanocomposites that comprise a matrix comprising at least one first hard magnetic component and a plurality of particles comprising at least one second hard magnetic component, wherein the plurality of particles comprising at least one second hard magnetic component are distributed in the matrix comprising at least one first hard magnetic component. In another aspect, the present invention relates to methods of making a bulk magnetic nanocomposite that comprise providing a first powder comprising at least one first hard magnetic component; providing a second powder comprising at least one second hard magnetic component; combining said first and second powders to form a mixture; processing said mixture to form a processed mixture wherein at least some deformation of said mixture has occurred; and warm compacting said processed mixture to form a bulk magnetic nanocomposite.

BRIEF DESCRIPTION OF THE DRAWINGS

FIG. 3 is a perspective view of a press system; useful in some embodiments of the present invention.

FIG. 4A is a schematic of the press system of FIG. 3.

FIG. 4B is an enlarged schematic of the portion indicated in FIG. 4A.

FIGS. 16A-C show a series of transmission electron microscopy (TEM) images of a series of bulk magnetic nanocomposites compacted at various temperatures.

DETAILED DESCRIPTION OF THE INVENTION

Figure 1:
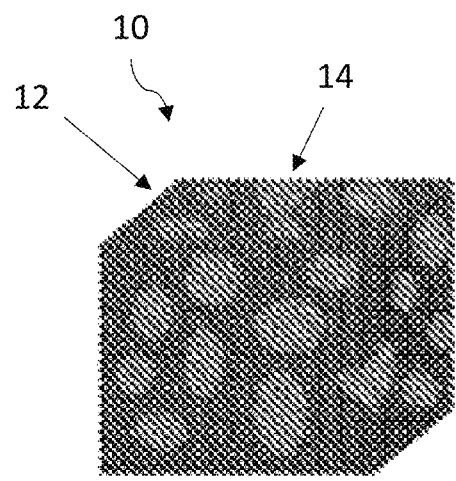
FIG. 1 is a depiction of a bulk magnetic nanocomposite according to some embodiments of the present invention.
Figure 2:
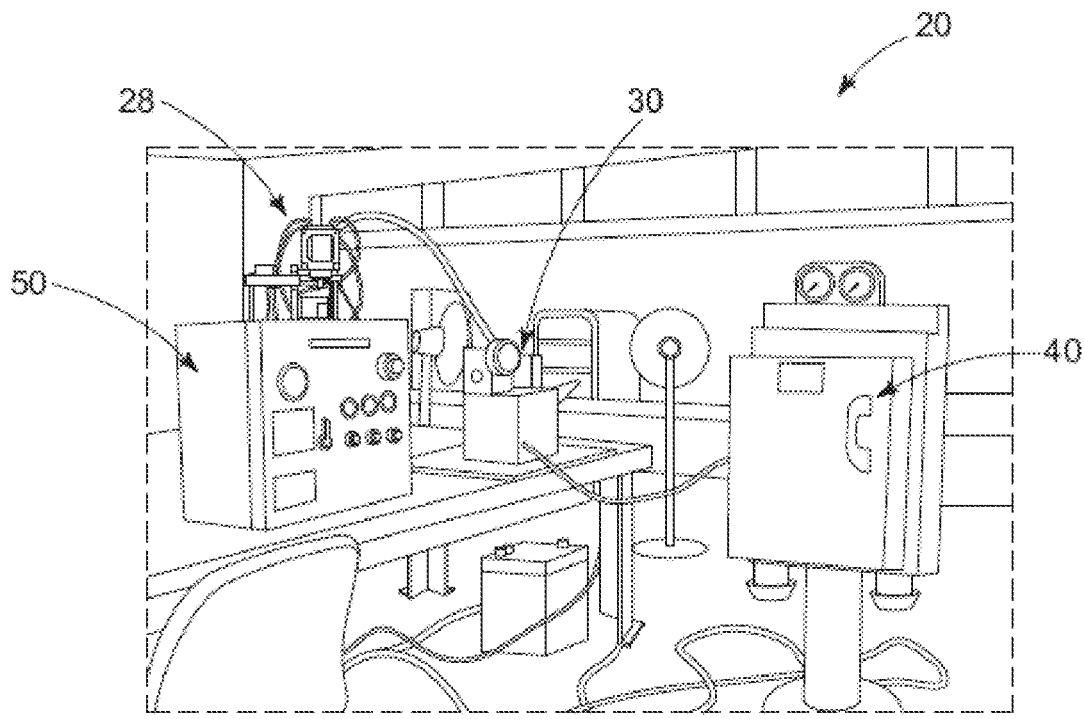
FIG. 2 is a photograph of a warm compaction apparatus useful in some embodiments of the present invention.

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains errors necessarily resulting from the standard deviation found in applicable testing measurements.

It is further noted that, as used in this specification, the singular forms "a," "an," and "the" include plural referents unless expressly and unequivocally limited to one referent.

As used herein, the term "bulk" refers to physical dimensions that are larger than the nanoscale or thin film regime. For example, a "bulk magnetic nanocomposite" refers to a magnetic nanocomposite having a dimension of at least about 0.5×0.5×0.5 mm, preferably at least about 1×1×1 mm, most preferably at least about 3×1.2×0.5 mm, alternatively between 6×1.5×0.5 mm. In addition, the terms "bulk nanocomposite" and "compact" are generally interchangeable when used as nouns herein, as will be understood from the context of the use of the terms.

As used in this specification, the term "energy product" means the maximum value of B times H that can be obtained from a given demagnetization curve (or demagnetizing quadrant in a hysteresis curve), where B is magnetic induction and H is magnetic field strength. The energy product is also denoted as $(BH)_{max}$ in this specification.

As used in this specification, the term "hard magnetic component" means a magnetic material that has a relatively large coercivity, greater than or equal to about 5000 Oe. The term "soft magnetic component" means a magnetic material that has a relatively small coercivity, less than or equal to about 1000 Oe.

In theory, it is possible to increase a hard magnetic material's energy product by combining the hard magnetic component or material with a soft magnetic material or component. If the hard and soft materials in a composite are effectively exchange coupled, the energy products of the resulting composite magnets are dependent not only on the intrinsic properties of the individual magnetic materials but also on the interaction between the materials. The interaction between the materials is affected by the nanoscale morphology of the composite. Relevant features of the nanoscale morphology include the distribution of the materials (e.g., whether the soft material is distributed in a particle-like way within the hard material, whether the soft material is distributed homogeneously in the hard material, etc.), the relative amounts of the materials, and, when applicable, the size of the soft material "particles" in at least one dimension. In general, to produce effective exchange coupling, particles of a soft magnetic material dispersed in a hard magnetic material must be smaller than a so called "critical size" in at least one dimension, where the value of the critical size is typically in the tens of nanometers and is determined by the domain wall thickness of the hard magnetic material and the magnetic properties of the soft magnetic material, as described, for example, in Z. S. Shan, J. P. Liu, V. M. Chkka, H. Zeng, and J. S. Jiang, *IEEE Trans. Magn.* 38, 2907 (2002), and Z. J. Guo, J. S. Jiang, J. E. Pearson, S. D. Bader, and J. P. Liu, *Appl. Phys. Lett.* 81, 2029 (2002), the entireties of which are incorporated herein by reference. Not intending to be bound by theory, in composite magnets comprising hard and soft magnetic materials, the hard magnetic material is believed to provide high coercivity, while the soft magnetic material is believed to provide high magnetization. Theoretical simulations have predicted that the energy product values of ideal nanocomposite systems can be as high as double that of the current highest value for Nd—Fe magnets.

In the past, it has been a grand technical challenge to fabricate an artificial three dimensional nanocomposite with a metallic material distributed in nanometer scale in a bulk matrix of another metallic material, homogenously and with desired compositions and morphology. Traditional processing techniques such as casting and sintering are ill-suited for producing nanostructured bulk materials because long annealing steps at high temperatures can lead to excessive grain growth. Further, the grain size in nanocomposite magnets fabricated by conventional top-down methods, including mechanical alloying and rapid quenching, usually has a wide distribution and generally cannot be controlled below the so called critical length. The present invention solves these and other problems, as further disclosed herein.

Some embodiments of the present invention relate to bulk magnetic nanocomposites. Some embodiments of bulk magnetic nanocomposites of the present invention can exhibit certain properties. For example, in some embodiments, bulk magnetic nanocomposites of the present invention can exhibit enhanced energy products. In other embodiments, bulk magnetic nanocomposites of the present invention can retain at high temperatures a large percentage of their room temperature energy product values. In still other embodiments, bulk magnetic nanocomposites of the present invention can exhibit a higher magnetization than exhibited by one or more of the individual magnetic components of the nanocomposite. In some embodiments, bulk magnetic nanocomposites of the present invention can exhibit a higher thermal stability than exhibited by one or more of the individual magnetic components of the nanocomposite.

In some embodiments of the present invention, a bulk magnetic nanocomposite comprises a matrix comprising at least one hard magnetic component and a plurality of particles comprising at least one soft magnetic component, wherein the plurality of particles comprising at least one soft magnetic component are distributed in the matrix comprising at least one hard magnetic component. FIG. 1 shows a schematic of one embodiment of a bulk magnetic nanocomposite of the present invention. Referring to FIG. 1, a bulk nanocomposite magnet 10 comprises at least one hard magnetic component 12 and at least one soft magnetic component 14. The bulk magnetic nanocomposite 10 may have any suitable three-dimensional shape. Non-limiting examples of bulk magnetic nanocomposite shapes include a cube, cuboid, cylinder, and polyhedron.

In some embodiments of the present invention comprising a bulk magnetic nanocomposite, substantially all of the plurality of particles comprising at least one soft magnetic component are no larger than a critical size in at least one dimension. The critical size can vary based on the domain wall thickness of the at least one hard magnetic component and the magnetic properties of the at least one soft magnetic component. In some embodiments, the critical size is no larger than about 20 nm or no larger than about 10 nm. In some embodiments of the present invention comprising a bulk magnetic nanocomposite, substantially all of the plurality of particles comprising at least one soft magnetic component are no larger than about 20 nm in at least one dimension. In other embodiments of the present invention comprising a bulk magnetic nanocomposite, substantially all of the plurality of particles comprising at least one soft magnetic component are no larger than about 10 nm in at least one dimension. In some embodiments of the present invention comprising a bulk magnetic nanocomposite, the plurality of particles comprising at least one soft magnetic component are substantially homogeneously distributed in the matrix comprising at least one hard magnetic component.

Figure 34:
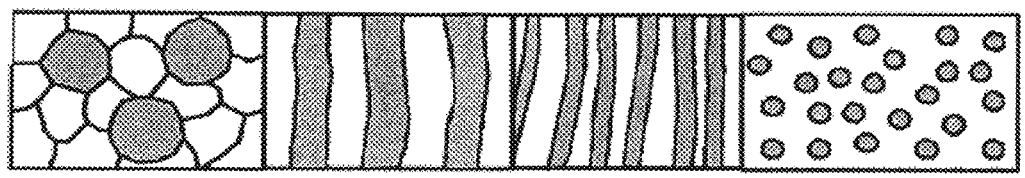
FIG. 34 is a schematic showing the microstructural evolution of a mixture of hard and soft magnetic materials during deformation (e.g., mechanical processing).

Not intending to be bound by theory, the foregoing "critical size" features of some embodiments of the present invention may result from what may be described as a "self-nanoscaling" process. It is believed that such "self-nanoscaling" is induced by severe plastic deformation, in particular by composite deformation behavior. In some embodiments of the present invention, the magnetically hard/soft component system is also a mechanically brittle/ductile system. With reference to FIG. 34, the presence of a narrowed and elongated component (e.g., the at least one soft magnetic component) may indicate the presence of a ductile component which undergoes more plastic deformation than a brittle component (e.g., the at least one hard magnetic component) until work hardening occurs. Further, not intending to be bound by theory, plastic deformation may change a composition's striped morphology into an equiaxed morphology by "necking" and breaking the strips. Surprisingly, the operation of these two processes in sequence is believed to occur in some embodiments of the present invention, resulting in the formation of nanoscale inclusions (or particles) comprising at least one soft magnetic component. In some embodiments of the present invention, a bulk magnetic nanocomposite comprises a matrix comprising at least one hard magnetic component and a plurality of particles comprising at least one soft magnetic component, wherein the plurality of particles comprising the at least one soft magnetic component are distributed in the matrix comprising the at least one hard magnetic component, and wherein the at least one hard magnetic component is a brittle material and the at least one soft magnetic component is a ductile material.

In some embodiments of the present invention, a bulk magnetic nanocomposite comprises a matrix comprising at least one hard magnetic component and a plurality of particles comprising at least one soft magnetic component, wherein the plurality of particles comprising at least one soft magnetic component are distributed in the matrix comprising at least one hard magnetic component, and wherein the at least one hard magnetic component is selected from the group consisting of $SmCo_3$, $SmCo_5$, $SmCo_7$, $Sm_2Co_7$, $Nd_2Fe_{14}B$, and FePt and mixtures thereof. In other embodiments of the invention comprising a bulk magnetic nanocomposite, the at least one hard magnetic component is $SmCo_5$ or $Sm_2Co_7$.

In some embodiments of the present invention, a bulk magnetic nanocomposite comprises a matrix comprising at least one hard magnetic component and a plurality of particles comprising at least one soft magnetic component, wherein the plurality of particles comprising at least one soft magnetic component are distributed in the matrix comprising at least one hard magnetic component, and wherein the at least one soft magnetic component is selected from the group consisting of $\alpha$-Fe, FeCo alloys, $Fe_4N$, $Fe_8N$, FeB, and FeNi alloys and mixtures thereof. In other embodiments of the invention comprising a bulk magnetic nanocomposite, the at least one soft magnetic component is $\alpha$-Fe or an FeCo alloy.

In some embodiments of the present invention, a bulk magnetic nanocomposite comprises a matrix comprising at least one hard magnetic component and a plurality of particles comprising at least one soft magnetic component, wherein the plurality of particles comprising at least one soft magnetic component are distributed in the matrix comprising at least one hard magnetic component, and wherein the at least one hard magnetic component is $SmCo_5$ or $Sm_2Co_7$ and the at least one soft magnetic component is $\alpha$-Fe or an FeCo alloy.

In some embodiments of the present invention, a bulk magnetic nanocomposite comprises a matrix comprising at least one hard magnetic component and a plurality of particles comprising at least one soft magnetic component, wherein the plurality of particles comprising at least one soft magnetic component are distributed in the matrix comprising at least one hard magnetic component, and wherein the at least one hard magnetic component comprises a first hard magnetic component and a second hard magnetic component.

In some embodiments of the present invention, a bulk magnetic nanocomposite comprises a matrix comprising at least one hard magnetic component and a plurality of particles comprising at least one soft magnetic component, wherein the plurality of particles comprising at least one soft magnetic component are distributed in the matrix comprising at least one hard magnetic component, and wherein the plurality of particles comprising at least one soft magnetic component are present in an amount from about 1 to about 35 weight percent of the matrix comprising at least one hard magnetic component. In some embodiments of the present invention, a bulk magnetic nanocomposite comprises a matrix comprising at least one hard magnetic component and a plurality of particles comprising at least one soft magnetic component, wherein the plurality of particles comprising at least one soft magnetic component are distributed in the matrix comprising at least one hard magnetic component, and wherein the plurality of particles comprising at least one soft magnetic component are present in an amount from about 1 to about 50 weight percent of the matrix comprising at least one hard magnetic component.

Some bulk magnetic nanocomposites of the present invention exhibit enhanced properties compared to other magnetic materials. More particularly, some bulk magnetic nanocomposites of the present invention exhibit properties that take advantage of the desirable properties of each magnetic component included in the bulk magnetic nanocomposite. Further, in accordance with the teachings contained herein, bulk magnetic nanocomposites can be designed to exhibit specific enhanced properties (e.g., enhanced energy product, magnetization, and/or thermal stability), in some embodiments of the present invention. Therefore, some bulk magnetic nanocomposites of the present invention may be considered to be "designer" materials.

In some embodiments of the present invention, a bulk magnetic nanocomposite comprises a matrix comprising at least one hard magnetic component and a plurality of particles comprising at least one soft magnetic component, wherein the plurality of particles comprising at least one soft magnetic component are distributed in the matrix comprising at least one hard magnetic component, and wherein the bulk magnetic nanocomposite exhibits an enhanced energy product compared to an analogous bulk magnetic material that does not comprise a plurality of particles comprising at least one soft magnetic component distributed in the matrix comprising at least one hard magnetic component (such an analogous bulk magnetic material may also be referred to herein as a "single phase counterpart" or "single component counterpart"). In other embodiments of the present invention comprising a bulk magnetic nanocomposite, the enhanced energy product is at least about 50 percent greater than the energy product exhibited by an analogous bulk magnetic material that does not comprise a plurality of particles comprising at least one soft magnetic component distributed in the matrix comprising at least one hard magnetic component. In still other embodiments, the enhanced energy product is at least about 100 percent greater than the energy product exhibited by an analogous bulk magnetic material that does not comprise a plurality of particles comprising at least one soft magnetic component distributed in the matrix comprising at least one hard magnetic component. In some embodiments, the enhanced energy product is at least 200 percent greater than the energy product exhibited by an analogous bulk magnetic material that does not comprise a plurality of particles comprising at least one soft magnetic component distributed in the matrix comprising at least one hard magnetic component. In other embodiments, the enhanced energy product is at least 300 percent greater than the energy product exhibited by an analogous bulk magnetic material that does not comprise a plurality of particles comprising at least one soft magnetic component distributed in the matrix comprising at least one hard magnetic component.

In some embodiments of the present invention, a bulk magnetic nanocomposite comprises a matrix comprising at least one hard magnetic component and a plurality of particles comprising at least one soft magnetic component, wherein the plurality of particles comprising at least one soft magnetic component are distributed in the matrix comprising at least one hard magnetic component, and wherein the bulk nanocomposite exhibits an energy product at about 300° C. that is at least about 60 percent of the energy product exhibited by the bulk magnetic nanocomposite at room temperature.

In some embodiments of the present invention, a bulk magnetic nanocomposite comprises a matrix comprising at least one first hard magnetic component, and a plurality of particles comprising at least one second hard magnetic component, wherein the plurality of particles comprising at least one second hard magnetic component are distributed in the matrix comprising at least one first hard magnetic component. Embodiments of bulk magnetic nanocomposites of the foregoing type are essentially analogous to embodiments of bulk magnetic nanocomposites comprising at least one soft magnetic component in addition to at least one hard magnetic component. Not intending to be bound by theory, in both types of bulk magnetic nanocomposites, exchange coupling between matrix and particulate magnetic components (whether hard-soft or hard-hard) is believed to be responsible for observed magnetic properties, including enhancement of the energy product. Thus, the schematic of FIG. 1 also describes some embodiments of "hard-hard" bulk magnetic nanocomposites of the present invention, provided that component 14 is understood to be the at least one second hard magnetic component rather than the at least one soft magnetic component. Further, the possible variations of the "hard-soft" embodiments described herein (including, for example, choice of magnetic materials, ratio of magnetic components, and critical size of the plurality of particles) in general apply to the "hard-hard" embodiments also. It should be further noted that, in some embodiments, the matrix comprising at least one first hard magnetic component can comprise or consist essentially of a plurality of particles comprising at least one first hard magnetic component. In such embodiments, both the at least one first hard magnetic component and the at least one second hard magnetic component can exhibit similar morphology.

In some embodiments of the present invention, a bulk magnetic nanocomposite comprises a matrix comprising at least one first hard magnetic component, and a plurality of particles comprising at least one second hard magnetic component, wherein the plurality of particles comprising at least one second hard magnetic component are distributed in the matrix comprising at least one first hard magnetic component, and wherein each of the at least one first hard magnetic component and the at least one second hard magnetic component is independently selected from the group consisting of $SmCo_3$, $SmCo_5$, $SmCo_7$, $Sm_2Co_7$, $Nd_2Fe_{14}B$, and FePt and mixtures thereof. In some embodiments of the present invention, a bulk magnetic nanocomposite comprises a matrix comprising at least one first hard magnetic component, and a plurality of particles comprising at least one second hard magnetic component, wherein the plurality of particles comprising at least one second hard magnetic component are distributed in the matrix comprising at least one first hard magnetic component, and wherein the at least one first hard magnetic component is $SmCo_5$ and the at least one second hard magnetic component is $Nd_2Fe_{14}B$. In some embodiments of the present invention, a bulk magnetic nanocomposite comprises a matrix comprising at least one first hard magnetic component, and a plurality of particles comprising at least one second hard magnetic component, wherein the plurality of particles comprising at least one second hard magnetic component are distributed in the matrix comprising at least one first hard magnetic component, and wherein the matrix comprising at least one first hard magnetic component comprises a plurality of particles comprising at least one first hard magnetic component.

Some bulk magnetic nanocomposites of the present invention exhibit enhanced properties compared to other magnetic materials. More particularly, some bulk magnetic nanocomposites of the present invention exhibit properties that take advantage of the desirable properties of each magnetic component included in the bulk magnetic nanocomposite. Further, in accordance with the teachings contained herein, bulk magnetic nanocomposites can be designed to exhibit specific enhanced properties (e.g., enhanced energy product, magnetization, and/or thermal stability), in some embodiments of the present invention. Therefore, some bulk magnetic nanocomposites of the present invention may be considered to be "designer" materials. In some embodiments of the present invention, a bulk magnetic nanocomposite comprises a matrix comprising at least one first hard magnetic component, and a plurality of particles comprising at least one second hard magnetic component, wherein the plurality of particles comprising at least one second hard magnetic component are distributed in the matrix comprising at least one first hard magnetic component, and wherein the bulk magnetic nanocomposite exhibits an enhanced energy product compared to an analogous bulk magnetic material that does not comprise a plurality of particles comprising at least one second hard magnetic component distributed in the matrix comprising at least one first hard magnetic component. In some embodiments of the present invention, a bulk magnetic nanocomposite comprises a matrix comprising at least one first hard magnetic component, and a plurality of particles comprising at least one second hard magnetic component, wherein the plurality of particles comprising at least one second hard magnetic component are distributed in the matrix comprising at least one first hard magnetic component, and wherein the bulk magnetic nanocomposite exhibits an enhanced magnetization compared to the lower of the magnetization exhibited by the at least one first hard magnetic component and the magnetization exhibited by the at least one second hard magnetic component. In some embodiments of the present invention, a bulk magnetic nanocomposite comprises a matrix comprising at least one first hard magnetic component, and a plurality of particles comprising at least one second hard magnetic component, wherein the plurality of particles comprising at least one second hard magnetic component are distributed in the matrix comprising at least one first hard magnetic component, and wherein the bulk magnetic nanocomposite exhibits an enhanced thermal stability compared to the lesser of the thermal stability exhibited by the at least one first hard magnetic component and the thermal stability exhibited by the at least one second hard magnetic component. In some embodiments of the present invention, a bulk magnetic nanocomposite comprises a matrix comprising at least one first hard magnetic component, and a plurality of particles comprising at least one second hard magnetic component, wherein the plurality of particles comprising at least one second hard magnetic component are distributed in the matrix comprising at least one first hard magnetic component, and wherein the bulk magnetic nanocomposite exhibits a Curie temperature greater than or equal to about 950K.

Some embodiments of the present invention relate to methods of making bulk magnetic nanocomposites. In some embodiments of the present invention, a method of making a bulk magnetic nanocomposite comprises providing a first powder comprising at least one hard magnetic component; providing a second powder comprising at least one soft magnetic component; combining said first and second powders to form a mixture; processing said mixture to form a processed mixture wherein at least some deformation of said mixture has occurred; and warm compacting said processed mixture to form a bulk magnetic nanocomposite. The processing can comprise mechanically processing in some embodiments of the present invention. The warm compacting can be carried out with a warm compaction apparatus 20 (as shown in FIGS. 2, 3, 4A and 4B) under pressure of at least about 0.1 to 6 GPa for a period of time of at least about 1 minute to 30 hours at temperatures ranging from about 20° C. to 700° C. to produce the bulk magnetic nanocomposite.

It should be further noted that, in some embodiments as disclosed herein, the relatively modest temperatures used in the warm compacting help maintain the chemical stability of the hard and soft magnetic phases. Warm compacting is based on surface/grain boundary diffusion induced deformation. Some important parameters in the warm compaction process are pressure, temperature, and time (also referred to as the P-T-t combination). Not intending to be bound by theory, it is believed that exchange coupling between hard and soft magnetic phases is enhanced by warm compacting. In some embodiments of the present invention, the P-T-t combination may be chosen in order to minimize grain growth or maximize the energy product of the resulting bulk magnetic nanocomposite.

In some embodiments of the present invention, a method of making a bulk magnetic nanocomposite comprises providing a first powder comprising at least one hard magnetic component; providing a second powder comprising at least one soft magnetic component; combining said first and second powders to form a mixture; processing said mixture to form a processed mixture wherein at least some deformation of said mixture has occurred; and warm compacting said processed mixture to form a bulk magnetic nanocomposite, wherein said processed mixture immediately prior to the warm compacting is at least one of ingots, ribbons, and a powder.

In some embodiments of the present invention, a method of making a bulk magnetic nanocomposite comprises providing a first powder comprising at least one hard magnetic component; providing a second powder comprising at least one soft magnetic component; combining said first and second powders to form a mixture; processing said mixture to form a processed mixture wherein at least some deformation of said mixture has occurred; and warm compacting said processed mixture to form a bulk magnetic nanocomposite, wherein the processing said mixture to form a processed mixture comprises one or more of ball milling, rolling, and crushing.

In some embodiments of the present invention, a method of making a bulk magnetic nanocomposite comprises providing a first powder comprising at least one hard magnetic component; providing a second powder comprising at least one soft magnetic component; combining said first and second powders to form a mixture; processing said mixture to form a processed mixture wherein at least some deformation of said mixture has occurred; and warm compacting said processed mixture to form a bulk magnetic nanocomposite, wherein the at least one hard magnetic component is selected from the group consisting of $SmCo_3$, $SmCo_5$, $SmCo_7$, $Sm_2Co_7$, $Nd_2Fe_{14}B$, and FePt and mixtures thereof.

In some embodiments of the present invention, a method of making a bulk magnetic nanocomposite comprises providing a first powder comprising at least one hard magnetic component; providing a second powder comprising at least one soft magnetic component; combining said first and second powders to form a mixture; processing said mixture to form a processed mixture wherein at least some deformation of said mixture has occurred; and warm compacting said processed mixture to form a bulk magnetic nanocomposite, wherein the at least one soft magnetic component is selected from the group consisting of $\alpha$-Fe, FeCo alloys, $Fe_4N$, $Fe_8N$, FeB, and FeNi alloys and mixtures thereof.

In some embodiments of the present invention, a method of making a bulk magnetic nanocomposite comprises providing a first powder comprising at least one hard magnetic component; providing a second powder comprising at least one soft magnetic component; combining said first and second powders to form a mixture; processing said mixture to form a processed mixture wherein at least some deformation of said mixture has occurred; and warm compacting said processed mixture to form a bulk magnetic nanocomposite, wherein the mass ratio of said first powder to said second powder ranges from about 99 to 1 to about 65 to 35. In other embodiments, the mass ratio of said first powder to said second powder ranges from about 99 to 1 to about 50 to 50.

Some magnetic materials (such as materials comprising rare earth elements) useful in some embodiments of the present invention oxidize readily at elevated temperatures in the presence of oxygen. Such oxidation is often undesirable due to the resulting degradation of desirable magnetic properties. Thus, in some methods of the present invention, it is desirable to avoid conditions that facilitate the oxidation of some magnetic materials. In some embodiments of the present invention, a method of making a bulk magnetic nanocomposite comprises providing a first powder comprising at least one hard magnetic component; providing a second powder comprising at least one soft magnetic component; combining said first and second powders to form a mixture; processing said mixture to form a processed mixture wherein at least some deformation of said mixture has occurred; and warm compacting said processed mixture to form a bulk magnetic nanocomposite, wherein the processing and the warm compacting are carried out under a substantially inert atmosphere. In other embodiments of the present invention comprising a method of making a bulk magnetic nanocomposite, the processing and the warm compacting are carried out under a substantially reducing atmosphere. In still other embodiments of the present invention comprising a method of making a bulk magnetic nanocomposite, the processing and the warm compacting are carried out under an atmosphere substantially free of oxygen. Non-limiting examples of substantially inert atmospheres useful in some methods of the present invention include atmospheres that consist essentially of argon (Ar), helium (He), or nitrogen ($N_2$). Non-limiting examples of gases that can be used as a component of a substantially reducing atmosphere include hydrogen ($H_2$), for example when mixed with an inert gas to form "forming gas."

In some embodiments of the present invention, a method of making a bulk magnetic nanocomposite comprises providing a first powder comprising at least one hard magnetic component; providing a second powder comprising at least one soft magnetic component; combining said first and second powders to form a mixture; processing said mixture to form a processed mixture wherein at least some deformation of said mixture has occurred; and warm compacting said processed mixture to form a bulk magnetic nanocomposite, wherein the processing said mixture to form a processed mixture is carried out for a time period sufficient to obtain a processed mixture wherein said soft magnetic phase exists in dispersed particles of a desired size and shape.

In some embodiments of the present invention, a method of making a bulk magnetic nanocomposite comprises providing a first powder comprising at least one hard magnetic component; providing a second powder comprising at least one soft magnetic component; combining said first and second powders to form a mixture; processing said mixture to form a processed mixture wherein at least some deformation of said mixture has occurred; and warm compacting said processed mixture to form a bulk magnetic nanocomposite, wherein the warm compacting is carried out at a temperature and pressure and for a time chosen to maximize the energy product of the bulk magnetic nanocomposite.

In some embodiments of the present invention, a method of making a bulk magnetic nanocomposite comprises providing a first powder comprising at least one hard magnetic component; providing a second powder comprising at least one soft magnetic component; combining said first and second powders to form a mixture; processing said mixture to form a processed mixture wherein at least some deformation of said mixture has occurred; annealing said processed mixture; and warm compacting said processed mixture to form a bulk magnetic nanocomposite. In some embodiments of the present invention, a method of making a bulk magnetic nanocomposite comprises providing a first powder comprising at least one hard magnetic component; providing a second powder comprising at least one soft magnetic component; combining said first and second powders to form a mixture; processing said mixture to form a processed mixture wherein at least some deformation of said mixture has occurred; annealing said processed mixture; and warm compacting said processed mixture to form a bulk magnetic nanocomposite, wherein the annealing is carried out at a temperature and for a time chosen to maximize the energy product of the bulk magnetic nanocomposite.

In some embodiments of the present invention, a method of making a bulk magnetic nanocomposite comprises providing a first powder comprising at least one first hard magnetic component; providing a second powder comprising at least one second hard magnetic component; combining said first and second powders to form a mixture; processing said mixture to form a processed mixture wherein at least some deformation of said mixture has occurred; and warm compacting said processed mixture to form a bulk magnetic nanocomposite. Embodiments of methods of the foregoing type ("hard-hard" methods) are essentially analogous to embodiments of methods comprising at least one soft magnetic component in addition to at least one hard magnetic component. The difference between the types of methods is essentially the choice of magnetic materials included in the first and second powders. Thus, the possible variations of the "hard-soft" embodiments described herein (including, for example, choice of magnetic materials, ratio of magnetic components, and critical size of the plurality of particles) in general apply to the "hard-hard" embodiments also.

In some embodiments of the present invention, a method of making a bulk magnetic nanocomposite comprises providing a first powder comprising at least one first hard magnetic component; providing a second powder comprising at least one second hard magnetic component; combining said first and second powders to form a mixture; processing said mixture to form a processed mixture wherein at least some deformation of said mixture has occurred; and warm compacting said processed mixture to form a bulk magnetic nanocomposite, wherein each of the at least one first hard magnetic component and the at least one second hard magnetic component is independently selected from the group consisting of $SmCo_3$, $SmCo_5$, $SmCo_7$, $Sm_2Co_7$, $Nd_2Fe_{14}B$, and FePt and mixtures thereof. In some embodiments of the present invention, a method of making a bulk magnetic nanocomposite comprises providing a first powder comprising at least one first hard magnetic component; providing a second powder comprising at least one second hard magnetic component; combining said first and second powders to form a mixture; processing said mixture to form a processed mixture wherein at least some deformation of said mixture has occurred; and warm compacting said processed mixture to form a bulk magnetic nanocomposite, wherein the at least one first hard magnetic component is $SmCo_5$ and the at least one second hard magnetic component is $Nd_2Fe_{14}B$.

As described above herein, in some embodiments of the present invention, methods can be varied in order to make bulk magnetic nanocomposites that exhibit specific enhanced properties (e.g., enhanced energy product, magnetization, and/or thermal stability). In some embodiments of the present invention, a method of making a bulk magnetic nanocomposite comprises providing a first powder comprising at least one first hard magnetic component; providing a second powder comprising at least one second hard magnetic component; combining said first and second powders to form a mixture; processing said mixture to form a processed mixture wherein at least some deformation of said mixture has occurred; and warm compacting said processed mixture to form a bulk magnetic nanocomposite, wherein the processing said mixture to form a processed mixture is carried out for a time period sufficient to obtain a processed mixture wherein said at least one second hard magnetic component exists in dispersed particles of a desired size and shape. In some embodiments of the present invention, a method of making a bulk magnetic nanocomposite comprises providing a first powder comprising at least one first hard magnetic component; providing a second powder comprising at least one second hard magnetic component; combining said first and second powders to form a mixture; processing said mixture to form a processed mixture wherein at least some deformation of said mixture has occurred; and warm compacting said processed mixture to form a bulk magnetic nanocomposite, wherein the warm compacting is carried out at a temperature and pressure and for a time chosen to maximize one or more of the energy product, the magnetization, and the thermal stability exhibited by the bulk magnetic nanocomposite. In some embodiments of the present invention, a method of making a bulk magnetic nanocomposite comprises providing a first powder comprising at least one first hard magnetic component; providing a second powder comprising at least one second hard magnetic component; combining said first and second powders to form a mixture; processing said mixture to form a processed mixture wherein at least some deformation of said mixture has occurred; and warm compacting said processed mixture to form a bulk magnetic nanocomposite, wherein the processing said mixture to form a processed mixture is carried out for a time period sufficient to obtain a processed mixture wherein said at least one second hard magnetic component exists in dispersed particles of a desired size and shape, and wherein the desired size and shape are chosen to maximize one or more of the energy product, the magnetization, and the thermal stability exhibited by the bulk magnetic nanocomposite.

In some embodiments of the present invention, a method of making a bulk magnetic nanocomposite comprises providing a first powder comprising at least one first hard magnetic component; providing a second powder comprising at least one second hard magnetic component; combining said first and second powders to form a mixture; processing said mixture to form a processed mixture wherein at least some deformation of said mixture has occurred; annealing said processed mixture; and warm compacting said processed mixture to form a bulk magnetic nanocomposite. In some embodiments of the present invention, a method of making a bulk magnetic nanocomposite comprises providing a first powder comprising at least one first hard magnetic component; providing a second powder comprising at least one second hard magnetic component; combining said first and second powders to form a mixture; processing said mixture to form a processed mixture wherein at least some deformation of said mixture has occurred; annealing said processed mixture; and warm compacting said processed mixture to form a bulk magnetic nanocomposite, wherein the annealing is carried out at a temperature and for a time chosen to maximize one or more of the energy product, the magnetization, and the thermal stability exhibited by the bulk magnetic nanocomposite.

As noted above, bulk magnetic nanocomposites in some embodiments of the present invention comprise a matrix comprising at least one hard magnetic component. In embodiments of the present invention comprising a matrix comprising at least one hard magnetic component, the matrix comprising at least one hard magnetic component can be any suitable matrix known to one of ordinary skill in the art. In some embodiments of the present invention, the matrix consists essentially of at least one hard magnetic component. As further noted above, methods of making bulk magnetic nanocomposites in some embodiments of the present invention comprise providing a first powder comprising at least one hard magnetic component. In addition, methods of making bulk magnetic nanocomposites in some embodiments of the present invention comprise providing a second powder comprising at least one hard magnetic component. In embodiments of the present invention comprising providing a first or second powder comprising at least one hard magnetic component, the first and/or second powder comprising at least one hard magnetic component can be any suitable powder known to one of ordinary skill in the art. In some embodiments of the present invention, the first and/or second powder consists essentially of at least one hard magnetic component. In some embodiments, the first and/or second powder comprises magnetic microparticles having an average size of about 1 μm to about 100 μm. In embodiments of the present invention comprising at least one hard magnetic component, the at least one hard magnetic component can be any suitable hard magnetic material known to one of ordinary skill in the art. Non-limiting examples of hard magnetic materials useful in some embodiments of the present invention include $SmCo_3$, $SmCo_5$, $SmCo_7$, $Sm_2Co_7$, $Nd_2Fe_{14}B$, and FePt and mixtures thereof. In embodiments of the present invention comprising more than one hard magnetic component, each hard magnetic component can be independently selected.

As noted above, bulk magnetic nanocomposites in some embodiments of the present invention comprise a plurality of particles comprising at least one soft magnetic component. As further noted above, methods of making bulk magnetic nanocomposites in some embodiments of the present invention comprise providing a second powder comprising at least one soft magnetic component. In embodiments of the present invention comprising providing a second powder comprising at least one soft magnetic component, the second powder comprising at least one soft magnetic component can be any suitable powder known to one of ordinary skill in the art. In some embodiments of the present invention, the second powder consists essentially of at least one soft magnetic component. In some embodiments, the second powder comprises magnetic microparticles having an average size of about 20 nm to about 100 μm. In embodiments of the present invention comprising at least one soft magnetic component, the at least one soft magnetic component can be any suitable soft magnetic phase known to one of ordinary skill in the art. Non-limiting examples of soft magnetic phases useful in some embodiments of the present invention include α-Fe, FeCo alloys, $Fe_4N$, $Fe_8N$, FeB, and FeNi alloys and mixtures thereof.

As noted above, some embodiments of the present invention comprise both at least one hard magnetic component and at least one soft magnetic component. In some embodiments, suitable magnetic materials can be separately selected for each of these components. In other words, the suitable hard magnetic components can be individually "mixed and matched" with the suitable soft magnetic components to achieve desired properties. Similarly, some embodiments of the present invention comprise at least one first hard magnetic component and at least one second hard magnetic component. In some embodiments, suitable magnetic materials can be separately selected for each of these components. In other words, the suitable first hard magnetic components can be individually "mixed and matched" with the suitable second hard magnetic components to achieve desired properties. Alternatively, a suitable hard magnetic components can be individually "mixed and matched" with a suitable soft magnetic components to achieve desired properties. In general, magnetic materials are chosen to take advantage of properties imparted by each material, such that the resulting bulk magnetic nanocomposite exhibits desirable features of each magnetic component without exhibiting some less desirable features of each magnetic component. For example, in some embodiments of the present invention, a hard magnetic component having a relatively high coercivity but relatively low saturation magnetization is combined with a soft magnetic component having a relatively low coercivity but relatively high saturation magnetization. It has been discovered that in this way, for example, a bulk magnetic nanocomposite can be obtained which exhibits both a higher coercivity than that of the soft magnetic component and also a higher saturation magnetization than that of the hard magnetic component. As a result, in some embodiments, the energy product can also be significantly enhanced (as demonstrated by hysteresis curves that are more "square"). Non-limiting examples of other properties that can optimized in this way include thermal stability (Curie temperature) and saturation magnetization.

As noted above, methods of making bulk magnetic nanocomposites in some embodiments of the present invention comprise processing a mixture to form a processed mixture wherein at least some deformation of said mixture has occurred. Processing a mixture can be carried out by any appropriate means known to one of ordinary skill in the art. In some embodiments, processing can be mechanically processing. Non-limiting examples of processing include ball milling, rolling, and crushing. In embodiments of the present invention comprising processing a mixture, the processing can be carried out for any suitable time period known to one of ordinary skill in the art for achieving the desired results, as further disclosed herein. Not intending to be bound by theory, it is believed that processing a mixture mixes the components of the mixture and cause severe plastic deformation of the components of the mixture (e.g., the micron sized particles of the powders) to form composites with the nanoscale morphology described herein. It should be further noted that, in general, processing can be carried out in various ways and for various times. Mechanical processing parameters include at least the following: type of processing (e.g., ball milling, rolling, or crushing), temperature at which processing occurs, and length of time over which processing occurs. Those of ordinary skill in the art will understand that these parameters can be altered to achieve a processed mixture having desired characteristics, such as a desired microstructure/nanoscale morphology. In some embodiments of the present invention, processing is carried out in such a way as to obtain a processed mixture wherein a plurality of particles comprising at least one first magnetic component is distributed in a matrix comprising at least one second magnetic component, as described herein. Non-limiting examples of mechanical processing temperatures useful in some embodiments of the present invention include cryogenic temperatures (e.g., 4 K or 77 K) and any temperature at which the relevant materials are stable. Non-limiting examples of mechanical processing times useful in some embodiments of the present invention include 30 minutes, 1 hour, 2 hours, and 4 hours.

As further noted above, methods of making bulk magnetic nanocomposites in some embodiments of the present invention comprise annealing a processed mixture. Annealing a processed mixture can be carried out by any appropriate means known to one of ordinary skill in the art. In embodiments of the present invention comprising annealing a processed mixture, the processing can be carried out for any suitable time period and at any suitable temperature known to one of ordinary skill in the art for achieving the desired results, as further disclosed herein. Non-limiting examples of annealing temperatures useful in some embodiments of the present invention include 400° C., 550° C., and 650° C. Non-limiting examples of annealing times useful in some embodiments of the present invention include 30, 60, and 120 minutes. Without intending to be bound by theory, it is believed that annealing can improve the magnetic performance of a bulk magnetic nanocomposite due to modification of the interface between hard and soft magnetic phases, including by reducing crystal strain.

As noted above, methods of making bulk magnetic nanocomposites in some embodiments of the present invention comprise warm compacting a processed mixture to form a bulk magnetic nanocomposite. Warm compacting a mixture can be carried out by any appropriate means known to one of ordinary skill in the art, for example by the means disclosed in United States Paten Application Publication 2010/0054981, the entirety of which is herein incorporated by reference. In embodiments of the present invention comprising warm compacting a mixture, the warm compacting can be carried out for any suitable time period and at any suitable temperature and pressure known to one of ordinary skill in the art for achieving the desired results, as further disclosed herein. Non-limiting examples of warm compacting times useful in some embodiments of the present invention include 1, 10, and 60 minutes. Non-limiting examples of warm compacting temperatures useful in some embodiments of the present invention include 20° C., 100° C., 200° C., 300° C., 400° C., 500° C., 600° C., and 700° C. Non-limiting examples of warm compacting pressures useful in some embodiments of the present invention include 0.5 GPa, 1.0 GPa, 2.5 MPa and 3.5 MPa. Not intending to be bound by theory, it is believed that in some embodiments of the present invention phase transitions (especially solid to liquid) can occur during warm compaction, and that such phase transitions may facilitate the consolidation of the bulk magnetic nanocomposite.

It should be further noted that, in some embodiments, calculations regarding nanoparticle deformation mechanisms and interfacial atomic diffusion may aid the optimization of warm compacting parameters. For example, parallel computing programs and Atomistic Computer Simulations may predict increased deformation at and through grain boundaries for a given set of warm compaction parameters, as disclosed in Swygenhoven et al., "Deformation in Nanocrystalline Metals"; Mats. Today; 9; 5 2006, 24-31, herein incorporated by reference. It is believe that increased deformation at and through the grain boundaries may increase the density and the magnetization of the resulting bulk magnetic nanocomposites.

EXAMPLES

Some exemplary embodiments of the present invention will now be illustrated in the following specific, non-limiting examples.

Example 1

This example demonstrates, among other things, the effects of various compositional and processing parameters on the physical and magnetic characteristics of processed mixtures and bulk magnetic nanocomposites of the present invention, as well as other magnetic materials. The various compositional and processing parameters include mechanical processing conditions (including processing time), ratio of hard and soft magnetic components, and warm compaction temperature.

Figure 5:
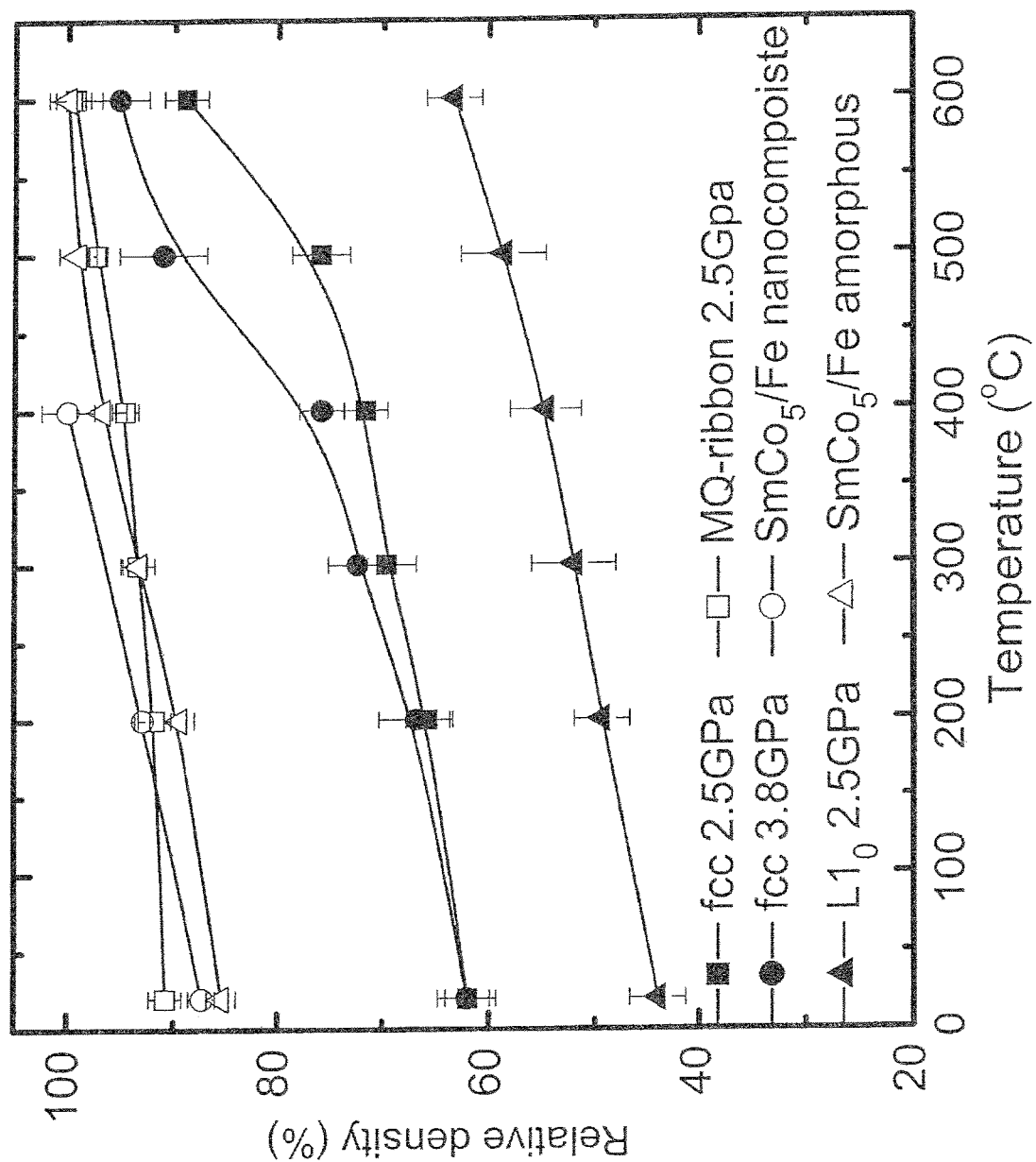
FIG. 5 is a graph showing the compaction temperature-dependence of the relative density of two embodiments of bulk magnetic nanocomposites of the present invention.

FIG. 5 compares the dependence of density on the compaction temperature for the following materials used as the starting material for making a bulk magnetic material via warm compacting: (a) fcc FePt nanoparticles under 2.5GPa; (b) fcc FePt nanoparticles under 3.8 GPa; (c) $L1_0$ FePt nanoparticles; (d) MQ-ribbons; (e) crystallized $SmCo_5$—Fe nanocomposite powders; and (f) amorphous SmCo—Fe powders. MQ-ribbons are NdFeB ribbons obtained by rapid quench plus a crushing process. NdFeB ribbons are compacted at different temperatures under 2.5 GPa. The size of the compacts is about $\varphi$=6 mm and h=2 mm. The density can reach 100% at 500-600° C., as shown in FIG. 5. The x-ray diffraction (XRD) patterns of the starting ribbons and 500° C.-compacted samples are quite similar. However, a change of grain size may be determined by a very sensitive XRD experiment. Hysteresis loops are also similar for different compaction temperatures. For the ideal SmCo—Fe composite, $(BH)_{max}$=65 MGOe. For the ideal $Sm_2Fe_{17}N_x$.FeCo composite, $(BH)_{max}$=120 MGOe.

Figure 6:
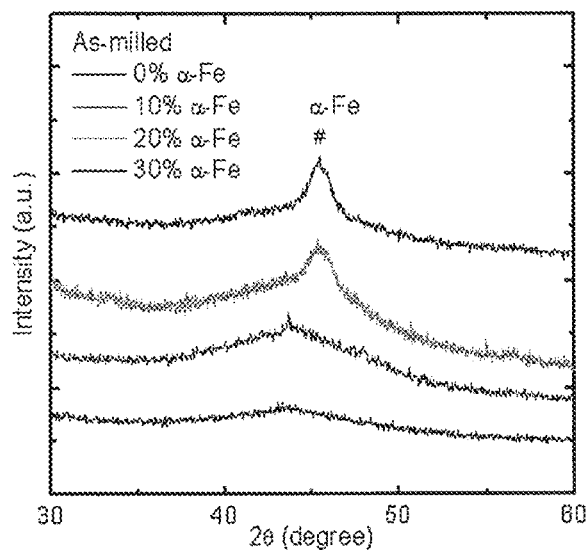
FIG. 6 shows a series of x-ray diffraction patterns of milled mixtures of amorphous SmCo powder and nanocrystalline Fe powder.
Figure 7:
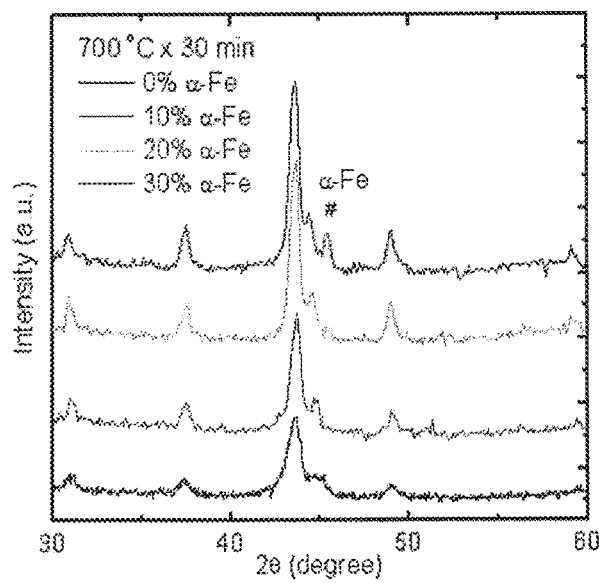
FIG. 7 shows a series of x-ray diffraction patterns of annealed mixtures of $SmCo_5$ and Fe powders.
Figure 8A:
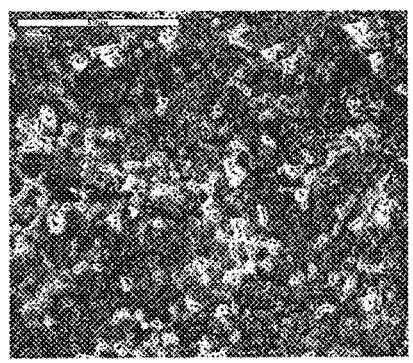
FIGS. 8A-F show a series of scanning electron microscope (SEM) images of a series of SmCo/Fe bulk magnetic nanocomposites compacted at various temperatures.
Figure 8B:
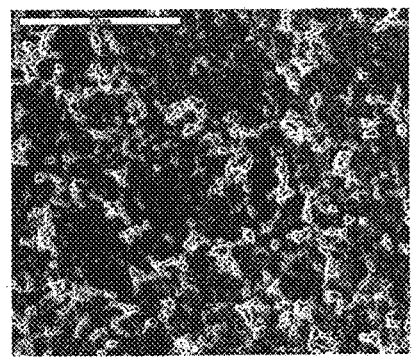
Figure 8C:
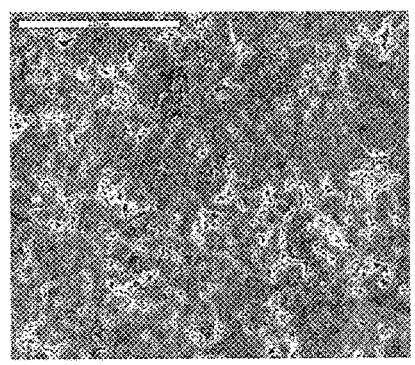
Figure 8D:
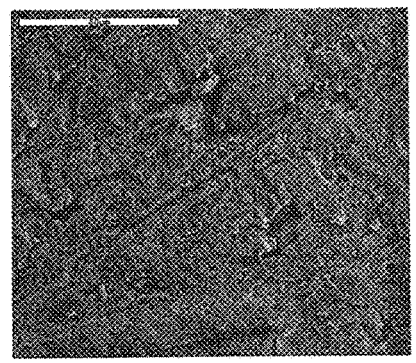
Figure 8E:
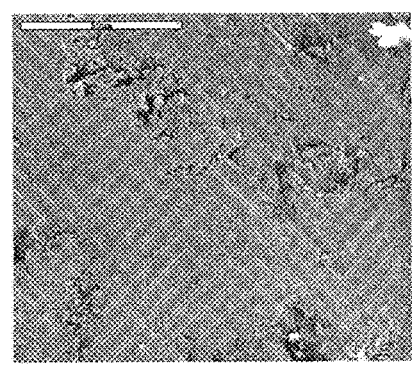
Figure 8F:
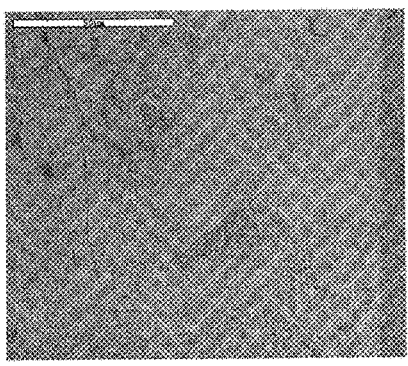

FIG. 6 is a graph of the XRD patterns of as-milled mixtures of amorphous SmCo and α-Fe nanocrystals. FIG. 7 is a graph of the XRD patterns of an annealed powder of $SmCo_5$ +α-Fe warm compacted at 700° C. for 30 min.

Figure 9:
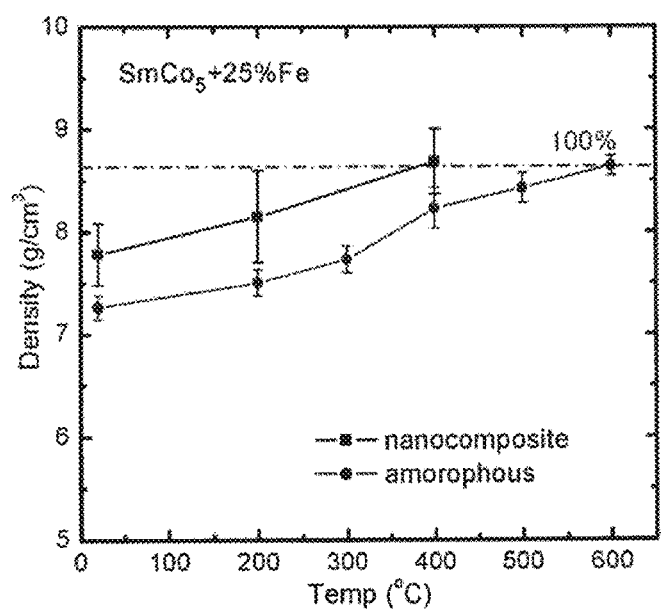
FIG. 9 is a graph showing the compaction temperature-dependence of the relative density of two embodiments of bulk magnetic nanocomposites of the present invention.

FIGS. 8A-F shows a series of scanning electron microscope (SEM) images of a series of SmCo/Fe bulk magnetic nanocomposites compacted at various temperatures: room temperature, 200° C., 300° C., 400° C., 500° C., and 600° C., respectively. Referring to FIG. 9, samples corresponding to FIGS. 8A-F are plotted on the "amorphous" curve, which indicates that density increases with compaction temperature. The "nanocomposite" curve corresponds to analogous samples that were also annealed under forming gas (93% Ar+7% $H_2$) for 1 hr.

Figure 10:
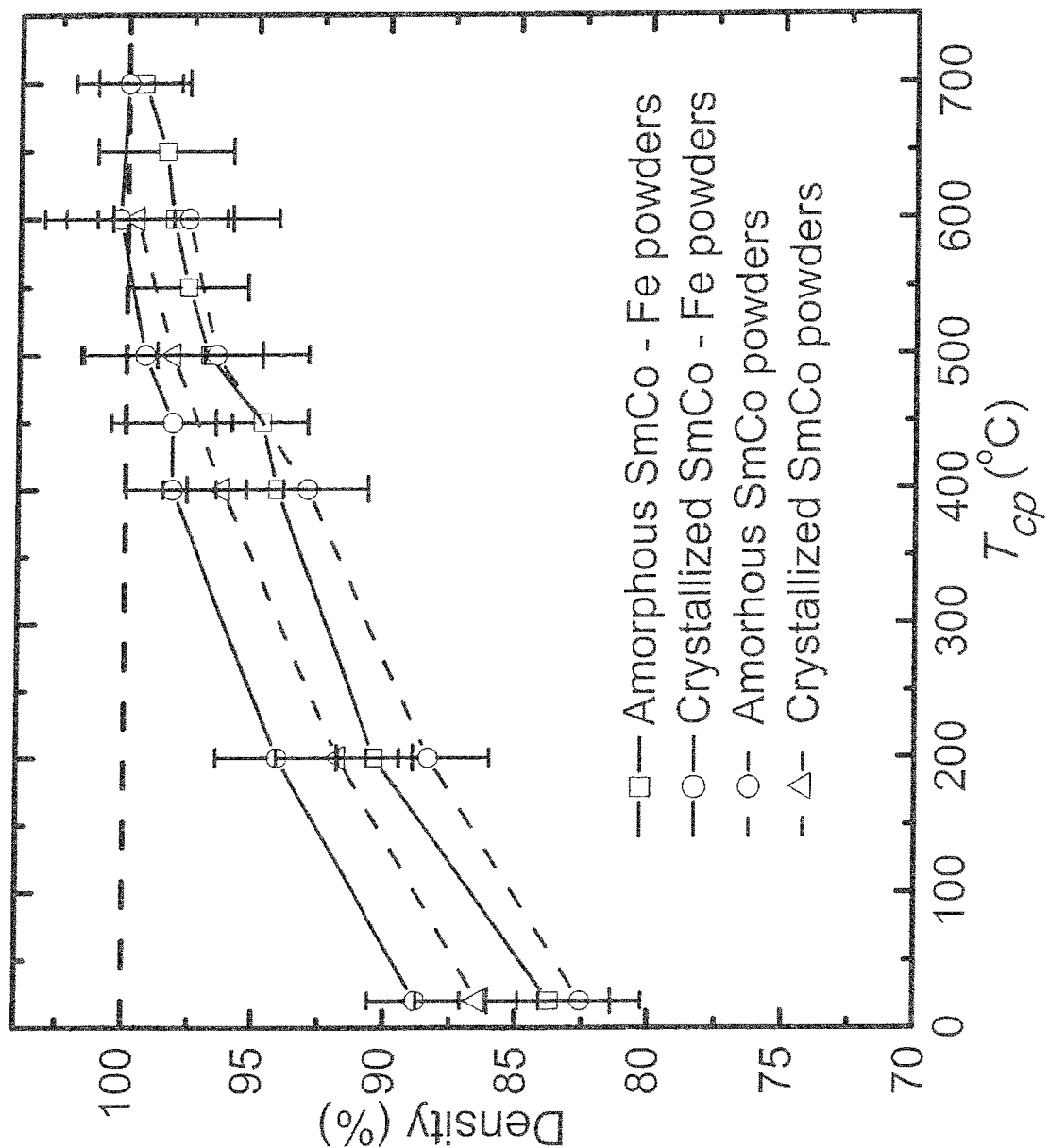
FIG. 10 is a graph showing the compaction temperature-dependence of the relative density of amorphous SmCo—Fe powder, crystallized SmCo—Fe powder, amorphous SmCo powder, and crystallized SmCo powder. Note that "crystallized" powders were annealed, while "amorphous" powders were note.
Figure 11:
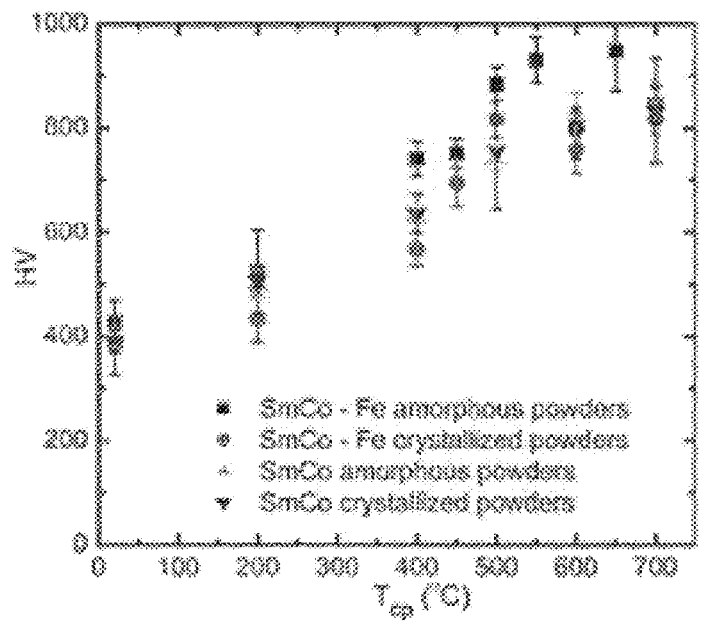
FIG. 11 is a graph showing the compaction temperature-dependence of the Vicker hardness ("HV") of amorphous SmCo—Fe powder, crystallized SmCo—Fe powder, amorphous SmCo powder, and crystallized SmCo powder.
Figures 12A, 12B:
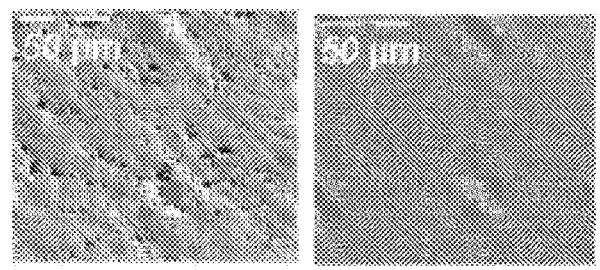
FIGS. 12A-D show a series of SEM images of a series of $SmCo_5$—Fe bulk magnetic nanocomposites compacted at various temperatures from crystallized powders.
Figures 12C, 12D:
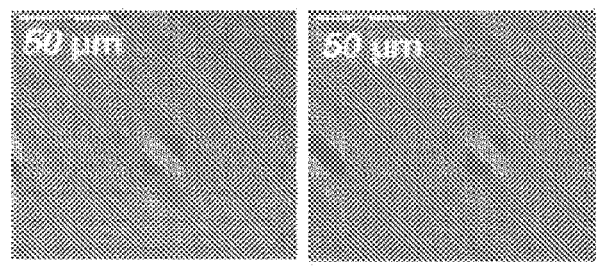

SmCo—Fe bulk magnets can be formed by ball milling SmCo and Fe powders and then warm compacting the processed mixture at 3.5 GPa and 600° C. to form 6-9 mm bulk nanocomposites. FIG. 10 shows the dependence of density on compaction temperature for amorphous SmCo—Fe powders, crystallized SmCo—Fe powders, amorphous SmCo powders, and crystallized SmCo powders. FIG. 11 shows the dependence of Vicker hardness (HV) on compaction temperature for SmCo—Fe amorphous powder, SmCo—Fe crystallized powder, SmCo amorphous powder, and SmCo crystallized powder. Amorphous powders are a solid in which there is no long-range order of the positions of the atoms. Crystallized or crystalline powders are solids in which there is long-range atomic order.

FIGS. 12A-D are SEM images of $SmCo_5$—Fe bulk magnetic nanocomposites made from crystallized powders and warm compacted at 20° C., 200° C., 400° C. and 600° C., respectively.

Figure 13:
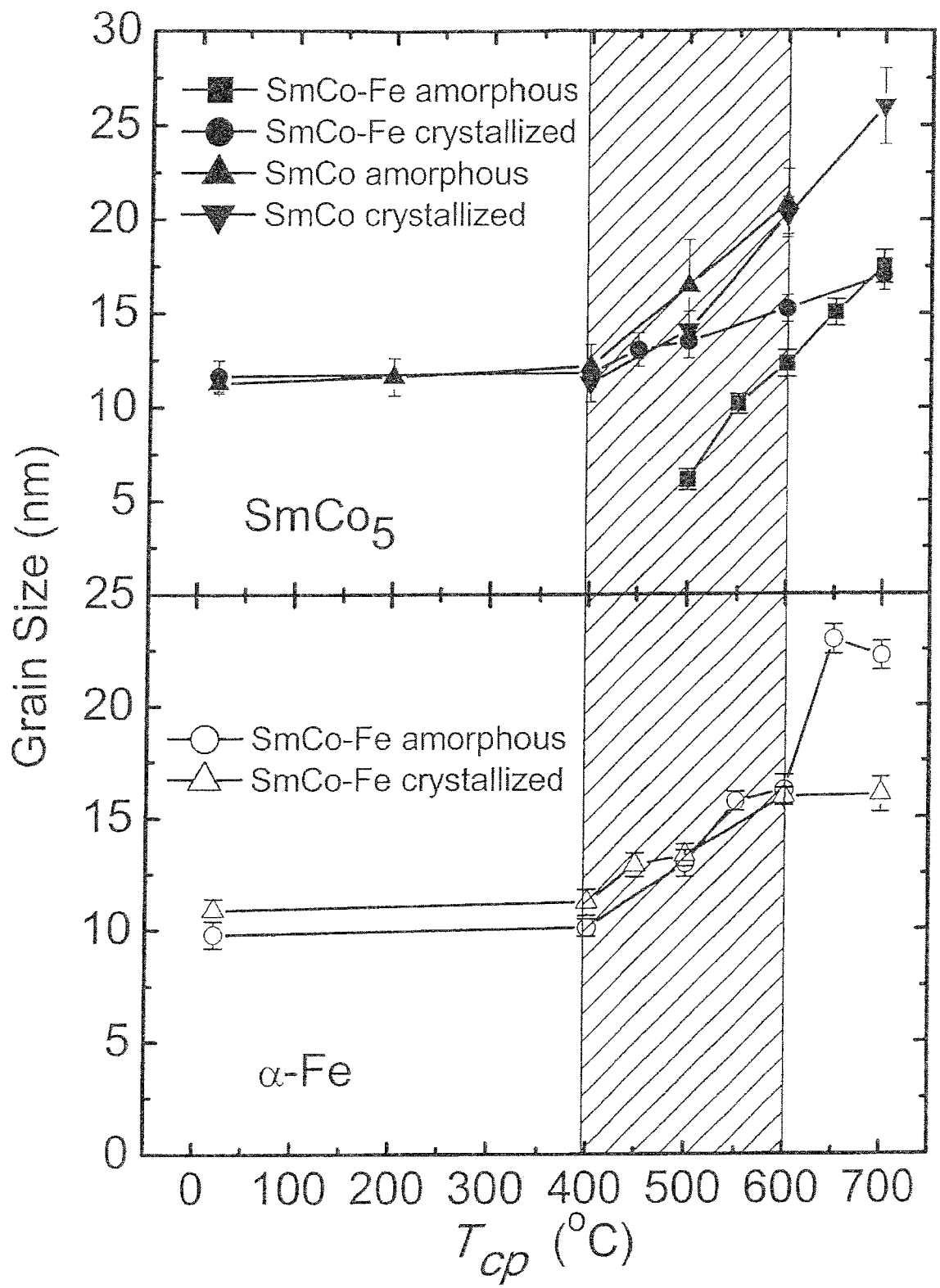
FIG. 13 consists of graphs showing the compaction temperature-dependence of the $SmCo_5$ and Fe grain sizes of a series of magnetic materials.
Figure 14:
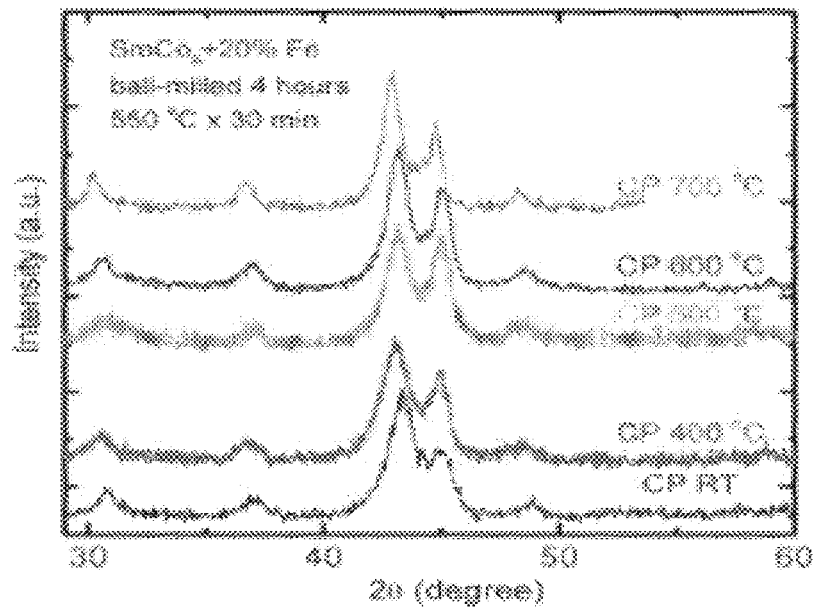
FIG. 14 shows a series of x-ray diffraction patterns of a series of bulk magnetic nanocomposites.
Figure 15:
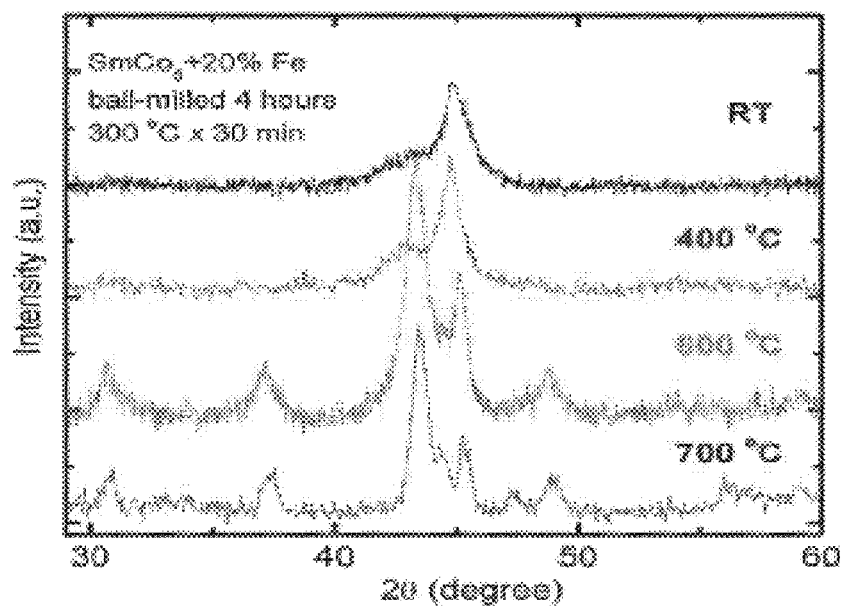
FIG. 15 shows a series of x-ray diffraction patterns of a series of bulk magnetic nanocomposites.

FIG. 13 shows the dependence of grain size of $SmCo_5$ on the compaction temperature. The grain sizes were measured from XRD patterns for SmCo—Fe amorphous powders, SmCo—Fe crystallized Fe powders, SmCo amorphous powders, and SmCo crystallized powders. The top graph shows $SmCo_5$ grain size, while the bottom graph shows α-Fe grain size. FIG. 14 shows the XRD patterns for $SmCo_5$+20% Fe ball milled for 4 hours and annealed at 550° C. for 30 minutes. FIG. 15 shows the XRD patterns for $SmCo_5$+20% Fe ball-milled 4 hours and annealed at 300° C. for 30 minutes.

FIGS. 16A-C show a series of transmission electron microscopy (TEM) images of a series of bulk magnetic nanocomposites compacted from crystallized nanocomposite $SmCo_5$/Fe powders at various temperatures: 400° C., 600° C. and 700° C., respectively. The TEM images show the temperature dependence of the grain sizes of the $SmCo_5$—Fe materials.

Figures 17A, 17B:
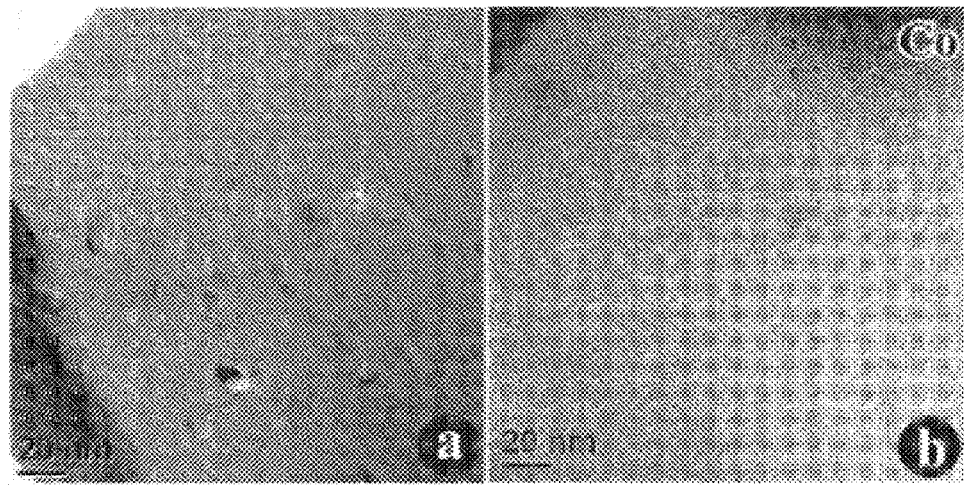
FIGS. 17A-D show a series of transmission electron microscopy (TEM) images of a bulk magnetic nanocomposite.
Figures 17C, 17D:
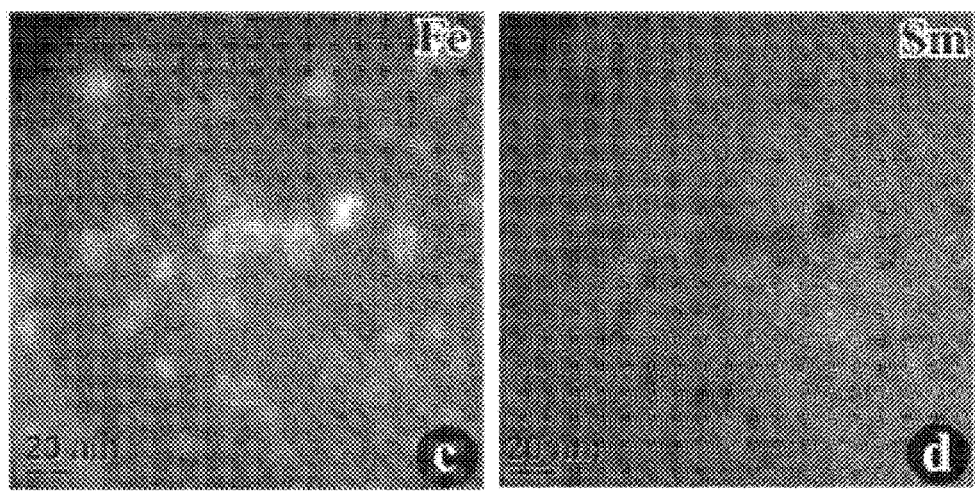

FIG. 17A is an energy filtered TEM (EFTEM) image of a $SmCo_5$/Fe bulk magnetic nanocomposite, where FIG. 17B shows the elemental distribution of Co, FIG. 17C shows the elemental distribution of Fe, and FIG. 17D shows the elemental distribution of Sm.

Figure 18:
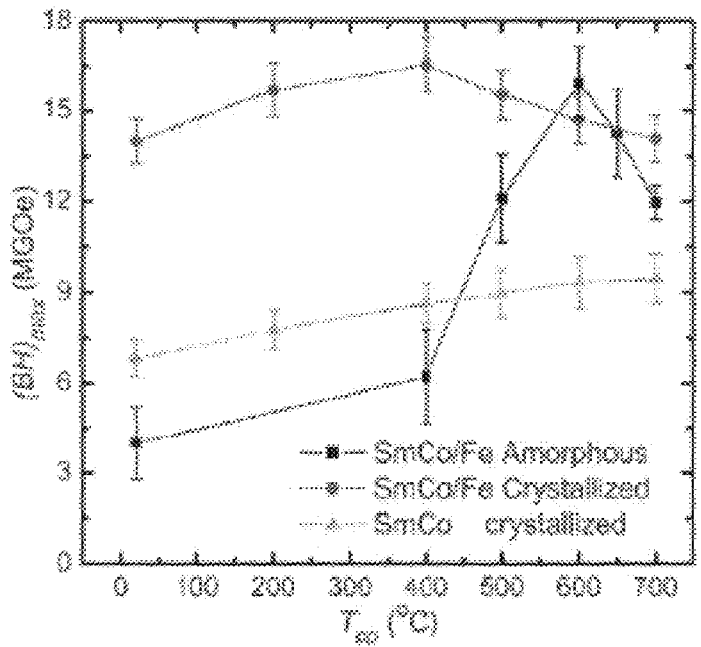
FIG. 18 is a graph showing the compaction temperature-dependence of the energy product of a series of magnetic materials.
Figure 19:
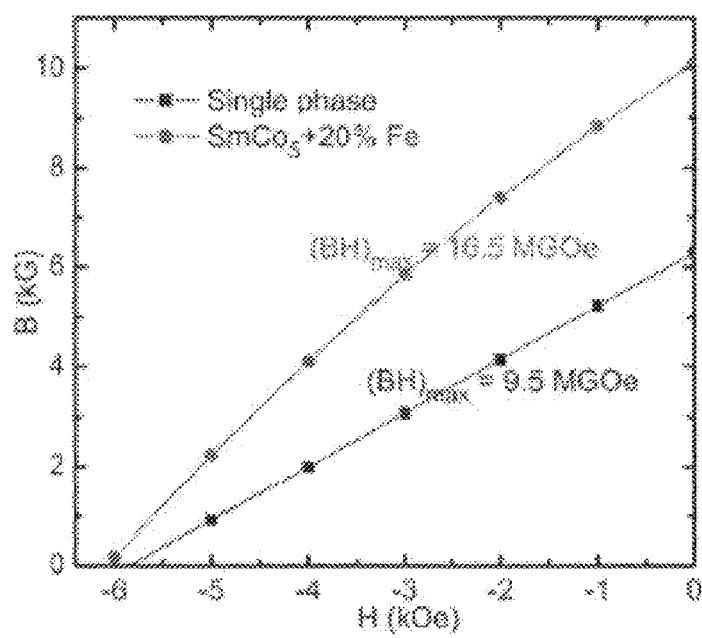
FIG. 19 is a graph showing the second-quadrant B—H curves of a series of magnetic materials.

FIG. 18 is a graph of the dependence of $(BH)_{max}$ on compaction temperature ($T_{cp}$) for samples compacted from amorphous and crystallized powders. FIG. 19 is a graph of the second-quadrant B—H curves of the bulk nanocomposite and single-phase magnets, with maximum energy products listed. The energy product enhancement is greater than 70% (16.5 MGOe for $SmCo_5$+20% Fe compared to 9.5 MGOe for the single phase counterpart $SmCo_5$).

Example 2

This example demonstrates, among other things, the effects of various compositional and processing parameters on the physical and magnetic characteristics of processed mixtures and bulk magnetic nanocomposites of the present invention, as well as other magnetic materials.

The raw materials of the Sm-Co based bulk magnetic nanocomposites described in this example were prepared by high energy ball milling the hard magnetic materials (e.g., $SmCo_5$ and $Sm_2Co_7$) and the soft magnetic materials (e.g., α-Fe and FeCo) in micrometer size (1-10 μm) followed by warm compaction of the milled mixtures at different temperatures under a pressure of ~2.5 GPa. The mixtures of hard and soft magnetic materials were mechanically milled in a high-energy ball milling machine (SPEX8000M). The weight ratio of soft phase to hard phase, x, ranged from 0 to 50%. For example, x=50% means that the weight ratio of FeCo to SmCo in a SmCo—FeCo composite is 0.5 to 1. The balls used for ball milling were made of 440C hardened steel. The ball diameter was ⅜inch, and the weight ratio of sample to ball was around 1 to 20. The milling time was adjusted between 0.5 and 10 hours to optimize the properties. The as-milled powders were annealed at temperatures ranging from 300 to 750° C. in a vacuum better than $1 \times 10^{-5}$ Pa. The annealed powders were sealed in a steel capsule and then compacted with a warm-compaction press under a pressure of 2.5 GPa for 10 minutes at temperatures ranging from room temperature (RT, about 20° C.) to 700° C. Resulting bulk composites had dimensions of φ6 mm×1.5 mm. The density was calculated by the sample mass over volume, where volume was calculated based on the regular shape of the bulk composite.

The thermodynamic behavior of the samples was examined by Netzsch differential scanning calorimetry (DSC) with model DSC 404C. The Vicker's hardness was measured by a LECO LM-247AT Microindentation Tester. The morphology and crystalline structure were characterized by scanning electron microscopy (SEM), transmission electron microscopy (TEM), scanning TEM (STEM), Energy-Filtered TEM (EFTEM), three-dimensional atom probe (3DAP) analysis and X-ray diffraction (XRD) using Cu $K_α$ radiation. The compositions of the compacted samples were checked by energy dispersive x-ray (EDX) analysis in the SEM. Magnetic properties were measured with a superconducting quantum interference device (SQUID) magnetometer with a maximum applied field of 70 kOe.

Figure 20:
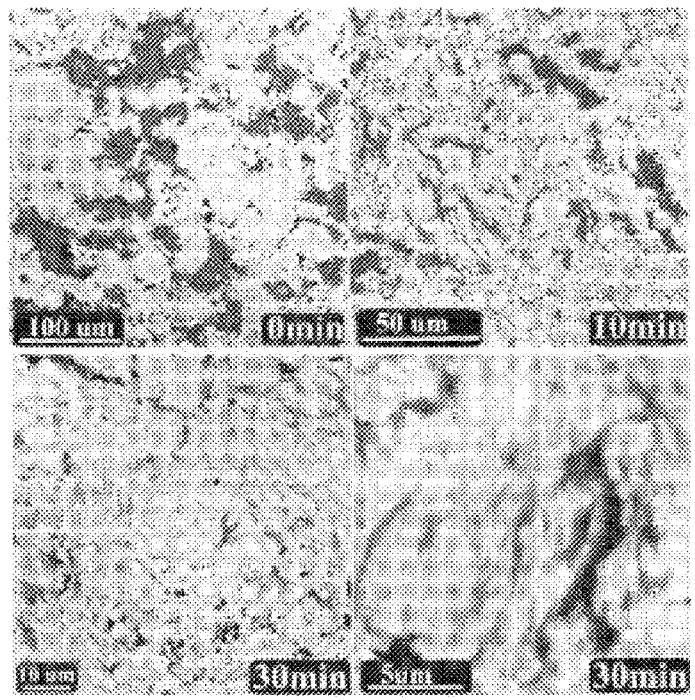
FIG. 20 shows a series of Backscattered Electron (BSE) images of a mixture of $SmCo_5$+20 wt. % Fe.
Figure 21:
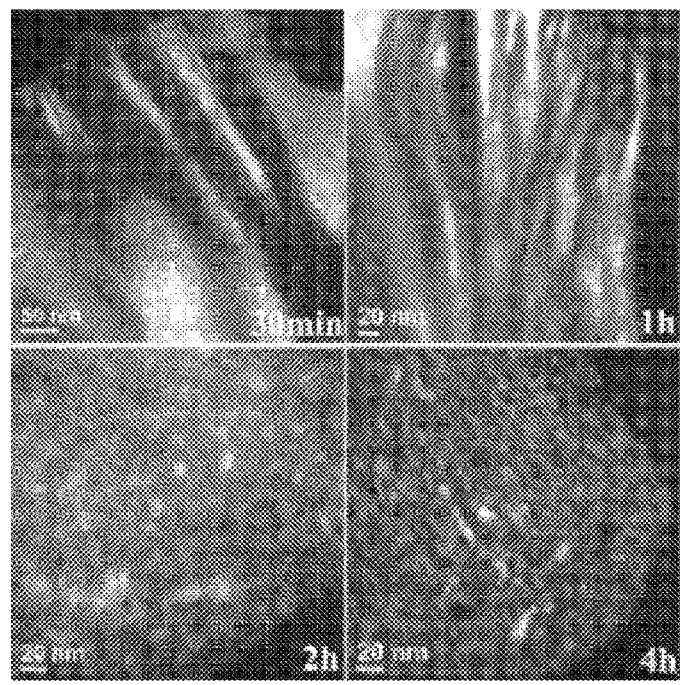
FIG. 21 shows a series of Energy Filtered Transmission Electron Microscope (EFTEM) images showing Fe maps of various bulk magnetic nanocomposites.
Figure 22:
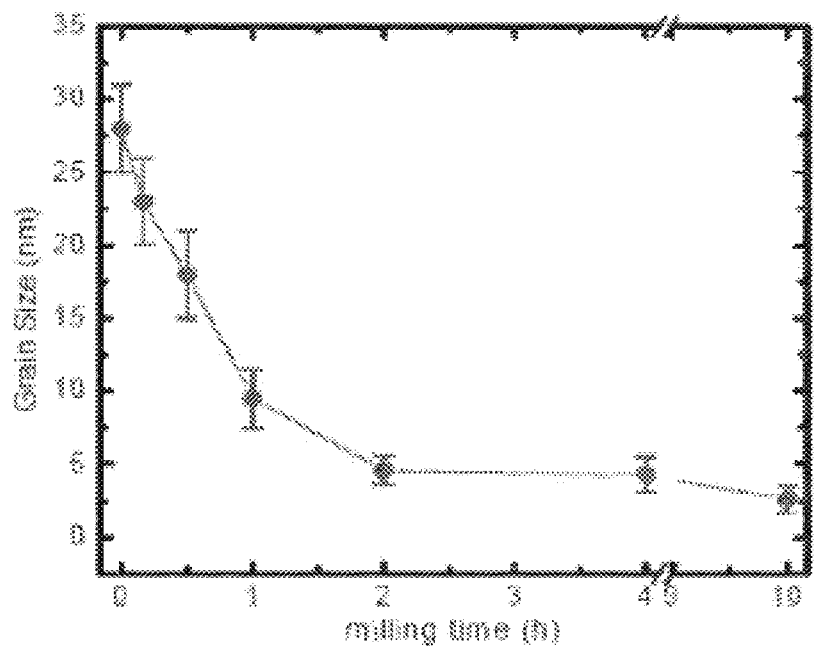
FIG. 22 is a graph showing the dependence of average α-Fe grain size on milling time.
Figure 23:
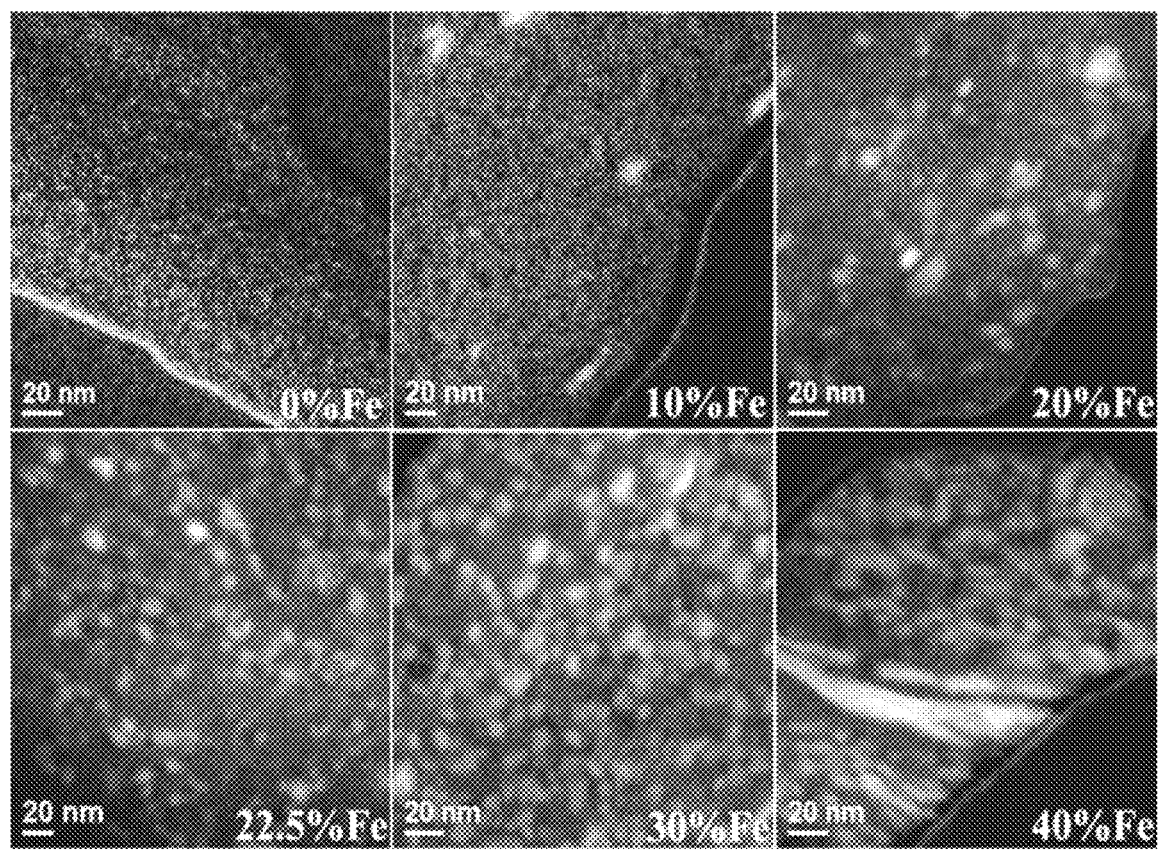
FIG. 23 is a series of EFTEM images of a series of $SmCo_5$—Fe nanocomposites with different Fe content.
Figure 24:
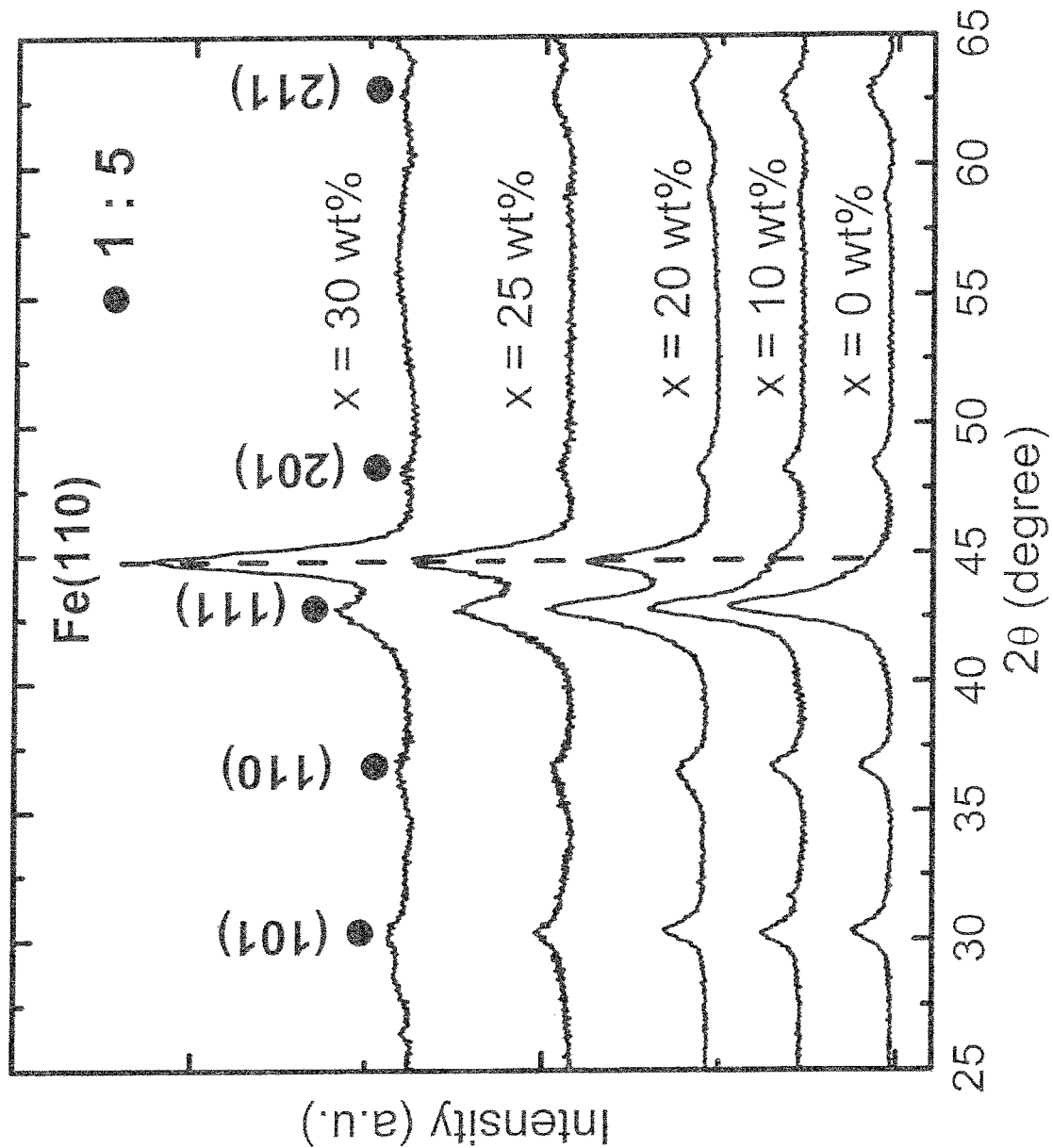
FIG. 24 is a series of x-ray diffraction patterns corresponding to the nanocomposites of FIG. 23.

The effect of milling time was monitored by microscopic observations and magnetic measurements, as shown in FIGS. 20-22, 35. For milling times of 30 min or less, the Backscattered Electron (BSE) images show moderate particle size commutation, as shown in FIG. 20. For longer milling times, higher magnification in the transmission electron microscope (TEM) was required. Energy filtered imaging in the TEM (EFTEM) can rapidly produce composition maps in sub-nanometer resolution showing distinct two-phased regions. FIG. 21 shows an unusual morphology after ~30 min of milling. The soft magnetic phase, initially equiaxed α-Fe, became narrow and elongated with increasing milling time, as shown in 21. With further milling, the nanoscale α-Fe strips began to break up into isolated equiaxed nanoscale grains, as shown in FIG. 22. After ~4 hrs of milling, the result was a homogenously distributed magnetically soft phase embedded in the hard phase matrix with a particle size smaller than 15 nm. Not intending to be bound by theory, these observations can be described as a "self-nanoscaling" of the soft phase grains induced by severe plastic deformation and can be attributed to brittle-ductile two-phase deformation behavior. The magnetically hard/soft composite system is also a mechanically brittle/ductile system. The presence of the narrowed and elongated α-Fe phase in the SmCo+Fe system shows that the ductile phase undergoes more plastic deformation than the brittle phase until work hardening occurs. Plastic deformation may change a striped morphology of a composite into an equiaxed morphology by "necking" and breaking the strips. These two processes were believed to have taken place in sequence in the SmCo—Fe hard-soft composites, which have the proper mechanical properties for the plastic deformation, resulting in a one thousand time size reduction of the soft phase inclusions and the formation of nanocomposites with the desired nanoscale morphology.

Figure 35:
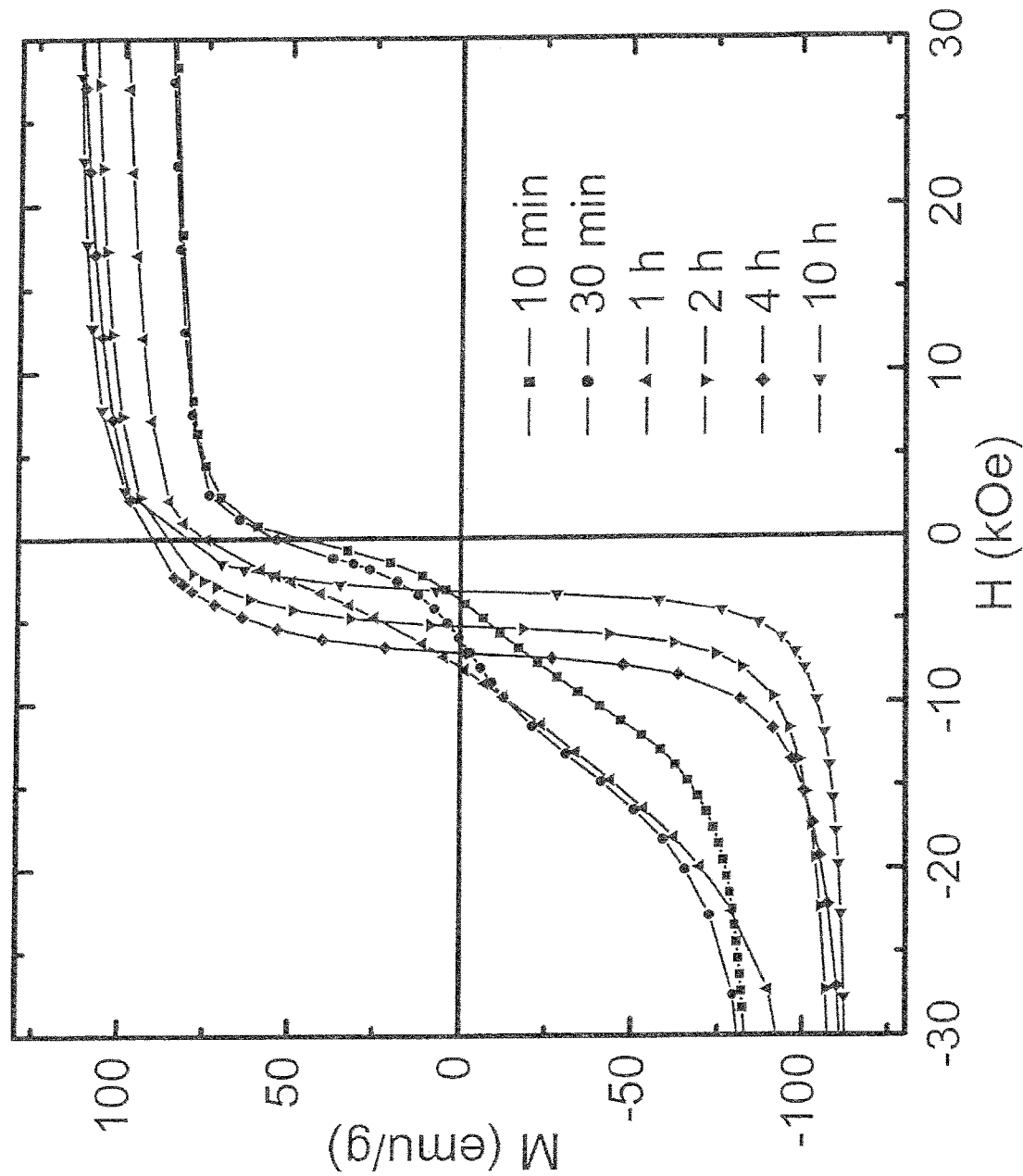
FIG. 35 is a graph showing the demagnetization curves of a series of nanocomposites milled for different time periods.

Simulations have shown that the size of the soft magnetic phase in the exchange-coupled composites must be smaller than a critical dimension (in the nanometer regime) determined by the hard-phase domain wall thickness and the soft-phase magnetic properties. This critical dimension is the upper limit for all the grains, not an average of the distribution. For example, a calculation gave the critical dimension of ~20 nm for a α-Fe-based soft phase in a $SmCo_5$ matrix. Maintaining this grain size can be challenging, however, because in many embodiments of the present invention it is desirable to add a substantial fraction of a soft phase in order to obtain a high magnetization. And, in general, the inclusion of large amounts of a soft magnetic material can lead to coarsening (increasing grain size) of the soft magnetic component in the composite, which can cause a de-coupling of the soft and hard components. FIG. 35 shows the demagnetization curves of the compacted and optimally annealed $SmCo_5$+20wt % Fe samples whose starting powders were milled for different times. It can be clearly seen in FIG. 35 that the curves for samples milled for less than 2 hours have a kink indicative of a de-coupled two-phase magnet due to the existence of soft-phase grains larger than 20 nm. Samples milled longer than 2 hours have smooth demagnetization curves and enhanced magnetization. Optimal milling time (for achieving the highest energy product) was 4 hours. This composite also exhibited a uniform nanoscale morphology. Further milling (up to 10 hours) did not lead to any improvement in energy product because of the reduced hard-phase thermal stability.

Figure 25:
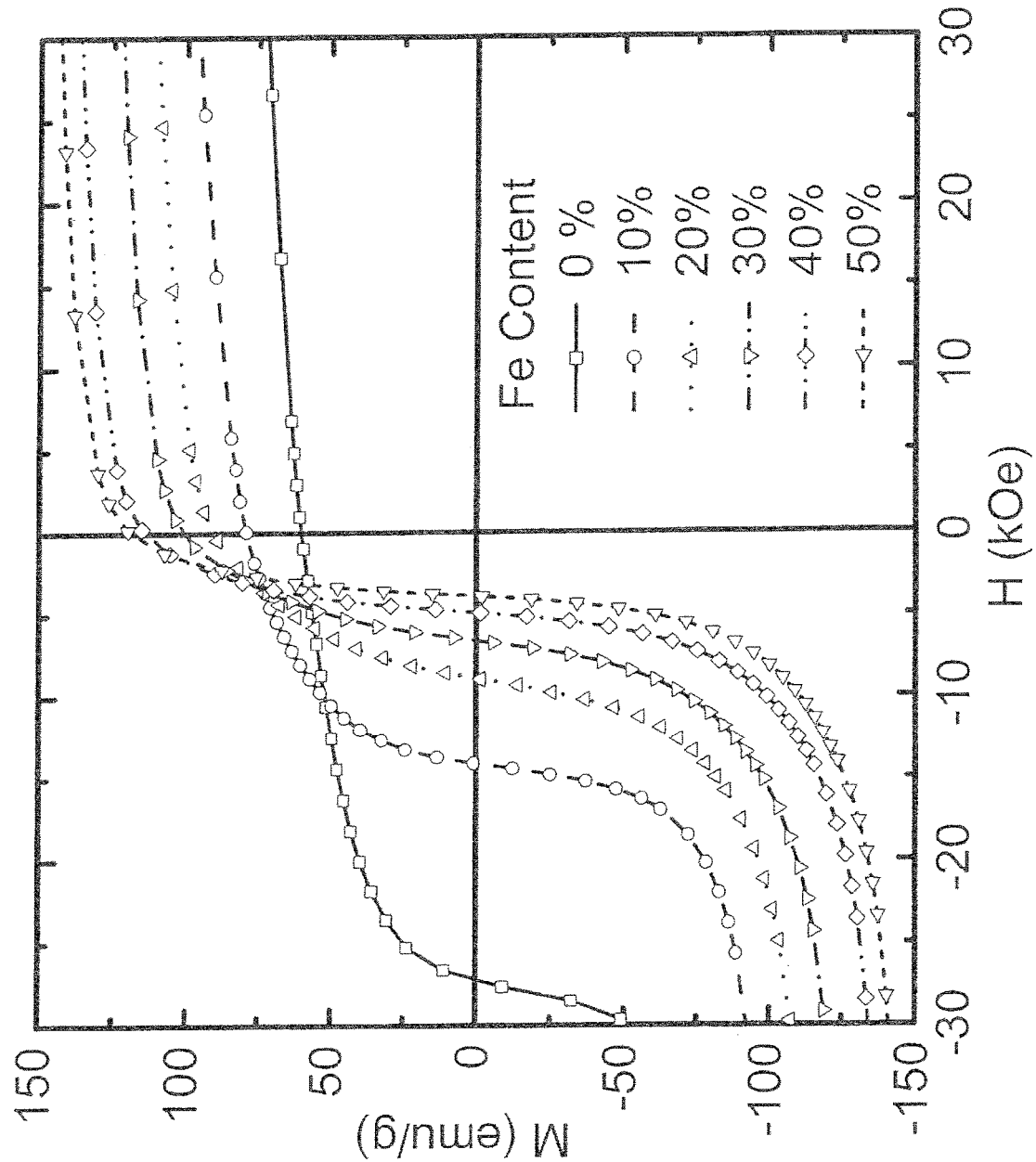
FIG. 25 is a series of demagnetization curves corresponding to the nanocomposites of FIG. 23.
Figure 26:
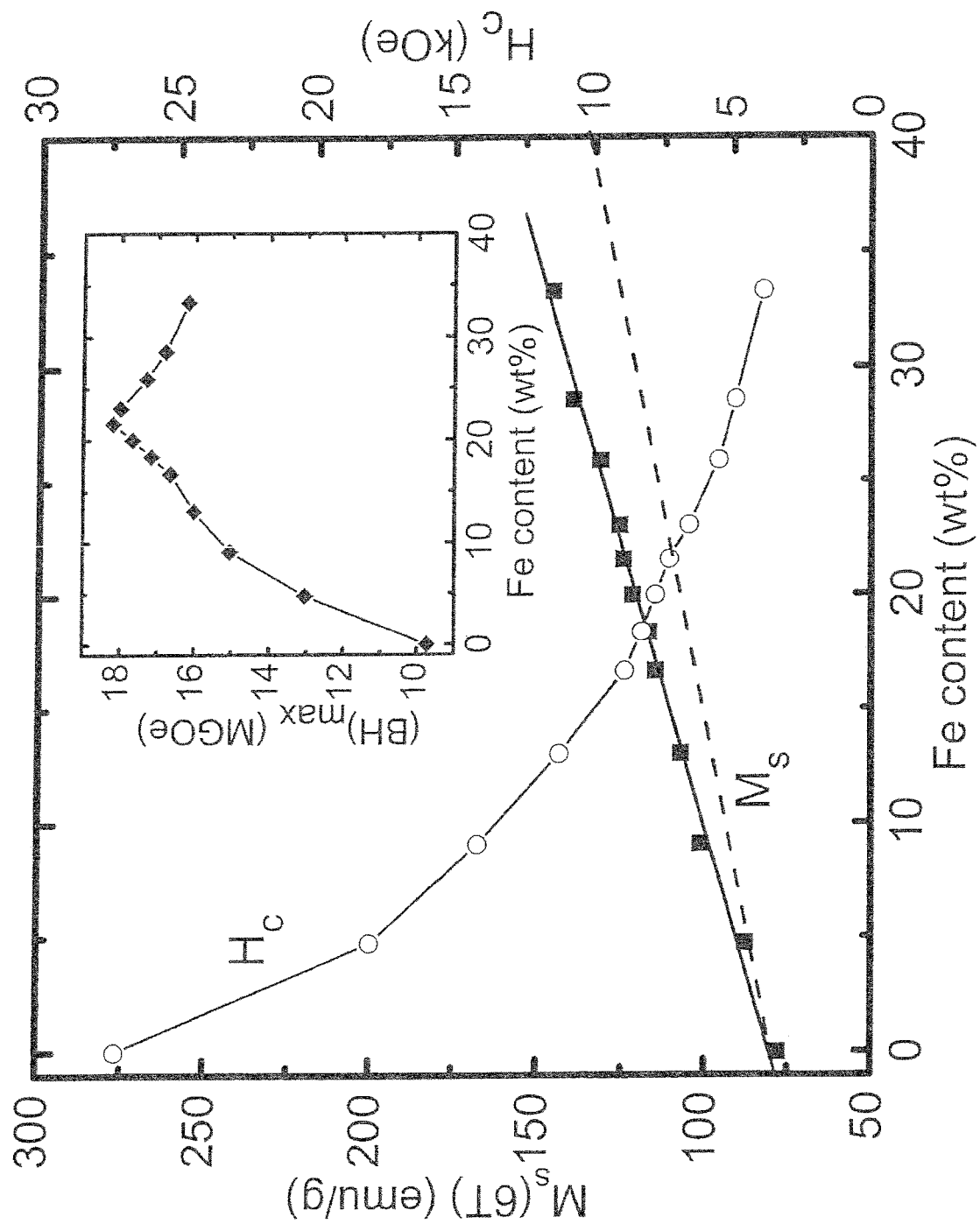
FIG. 26 consists of graphs showing the saturation magnetization, coercivity and $(BH)_{max}$ values for a series of nanocomposites as a function of soft magnetic material content.

Theoretically more than 50% of a soft phase can be added into a nanocomposite magnet without losing appreciable coercivity of the composite provided that the soft-phase dimension can be kept under the critical length. Practically, however, any increase in the soft-phase fraction is accompanied by sacrifice in coercivity of the composite magnets. To understand the trade-off between the magnetization and coercivity, the soft-phase fraction dependence of magnetic properties of the $SmCo_5$/Fe system were investigated. FIGS. 23-26 show the morphology and the energy product changes upon increasing α-Fe content in the $SmCo_5$/Fe nanocomposites. FIGS. 23-26 show that the isolated soft-phase inclusions are homogenously distributed when the weight fraction was gradually increased from 0% to about 30%. When more soft phase magnetic particles were added, the soft-phase's self-nanoscaling did not take place throughout the sample, leaving large soft-phase strips and leading to a significant reduction of the coercivity and therefore the energy product, as shown in FIG. 25. FIG. 26 shows the soft-phase fraction dependence of the magnetization, coercivity, and the energy product. The opposite correlation to the soft-phase fraction for the magnetization and the coercivity has given a maximum in the energy product value at ~25 wt % Fe.

The gain in saturation magnetization upon soft-phase addition in a hard/soft nanocomposite can be described as $$M_{com}, M_{soft} +(1-X)M_{hard}, \quad (1)$$

where $M_{com}$, $M_{soft}$ and $M_{hard}$ are the saturation magnetization for the composite, the soft phase and the hard phase, respectively; and x is the soft phase fraction. This linear correlation was plotted as the dashed line in FIG. 26 for the $SmCo_5$/Fe system. The experimental data, which are also in a linear correlation to x, were plotted as the dots, and a significant deviation was observed. The measured magnetization was consistently higher than the values given by Equation (1). Detailed structural analysis showed that this deviation was caused by the interdiffusion in the $SmCo_5$/Fe nanocomposite. After the pre-compaction annealing and the warm compaction, the pure α-Fe phase became an FeCo alloy with higher magnetization, as discussed below.

To calculate the true energy product of the bulk magnetic nanocomposites, the demagnetization factor is needed. However, the theoretical demagnetization factor, which is used for homogenous samples, may not be applicable to nanocomposites. Therefore, the demagnetization factor was determined experimentally. The (φ6×h1.2 mm $SmCo_5$/Fe bulk sample was used as an example. The demagnetization curves at different directions were measured by SQUID with a maximum applied field of 6 T. Measured demagnetization curves at parallel and perpendicular directions to the axis of the bulk nanocomposites were taken. In principle, the demagnetization curves should be the same along different measuring directions after demagnetization corrections. Note that $N_c+2N_a=1$ if the demagnetization factor is parallel and perpendicular to the axis of disk as N, and $N_a$ respectively. From this, $N_c$=0.56 and $N_a$=0.22 were obtained, which differ from the theoretical values $N_c$=0.66 and $N_a$=0.17, which may be caused by inhomogeneity in the real samples (the theoretical model assumes homogenous media). After demagnetization corrections, the real energy product of the compacted samples was calculated from the corrected demagnetization curves.

Figure 27:
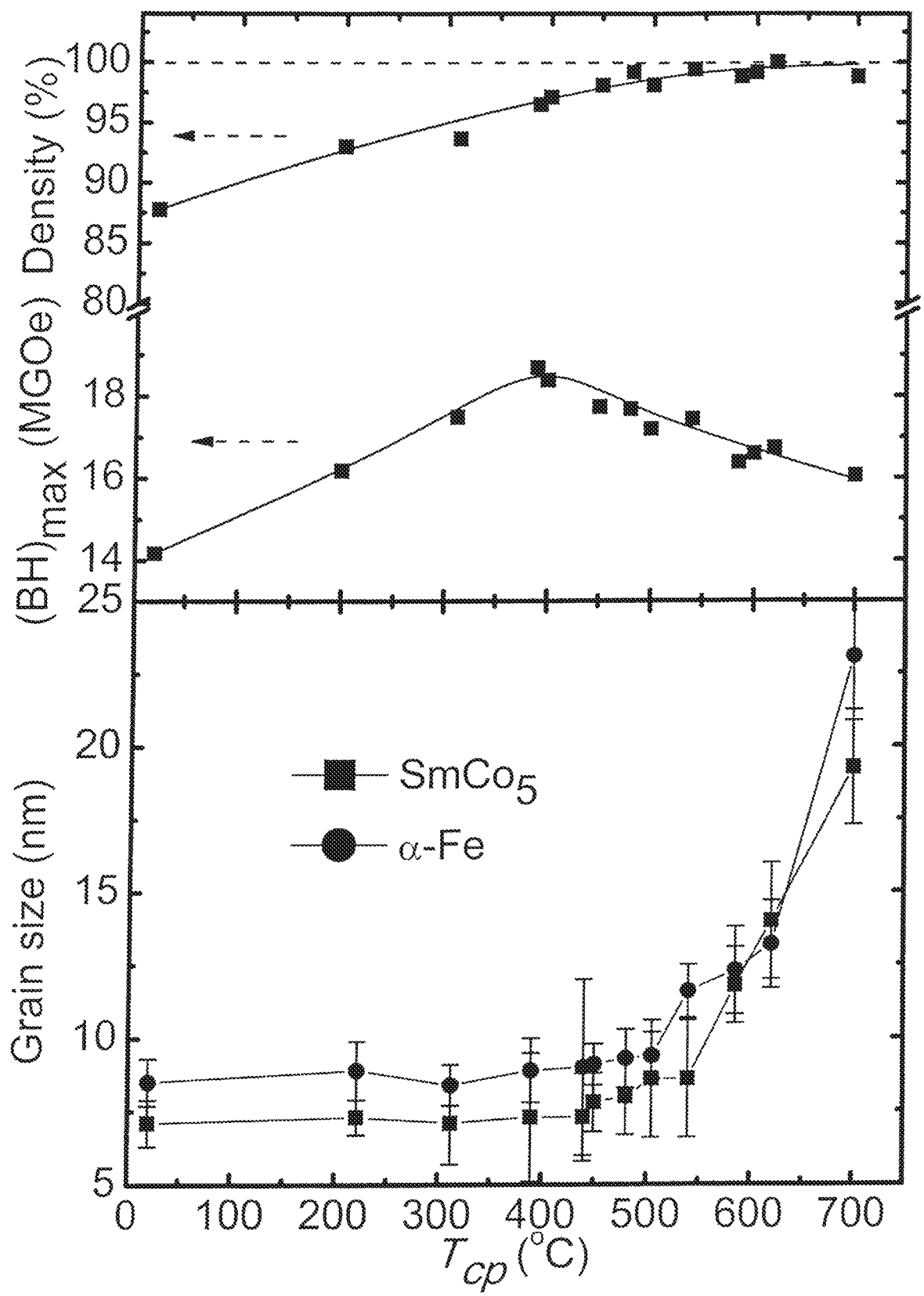
FIG. 27 consists of graphs showing the dependence of density, average grain size, and $(BH)_{max}$ of a series of $SmCo_5$/Fe bulk magnetic nanocomposites on compaction temperature.
Figure 28:
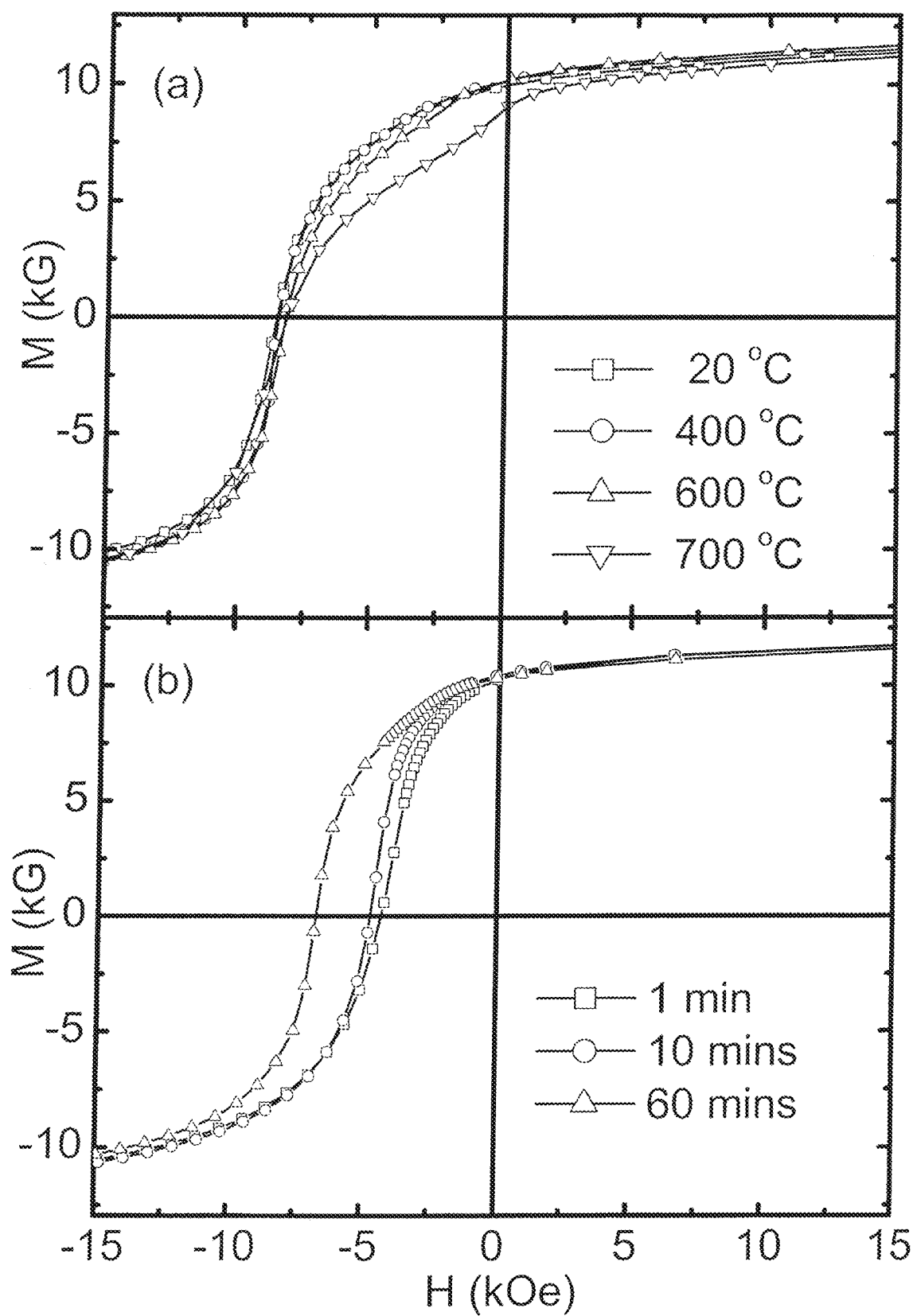
FIG. 28 consists of graphs showing the demagnetization curves of a series of bulk magnetic nanocomposites.

While the soft-phase dimension and fraction were observed to affect the energy product, the warm compaction conditions also were observed to affect magnet performance. Warm compaction of the nanocomposite magnets was performed at temperatures from 20° C. to 700° C. FIG. 27 shows the density, grain size, and energy product dependence on the compaction temperature for the $SmCo_5$-based nanocomposite system. The highest energy product was achieved at temperatures around 400° C. FIG. 28 shows that when the composite was compacted at an elevated temperature (above 500° C.), the demagnetization curves showed de-coupling behavior (kinking).

The lower part of FIG. 28 shows the demagnetization curves of the samples compressed at 500° C. for different pressure-holding times. Longer holding times increased the energy product by improving the coercivity and the squareness of the loops. Not intending to be bound by theory, this affect is believed to be attributable to the inter-phase exchange coupling favoring the interdiffused interface (graded interface). It is believed that extended pressure-holding at modest warm compaction temperature facilitates the interdifussion of Co—Fe without grain growth.

Figure 29:
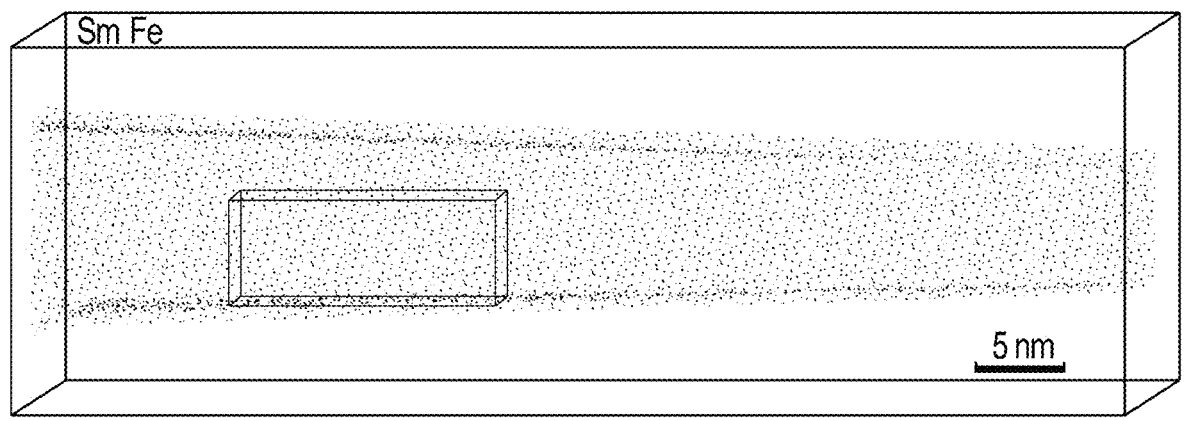
FIG. 29 is a three-dimensional atom map of a bulk magnetic nanocomposite.
Figure 30:
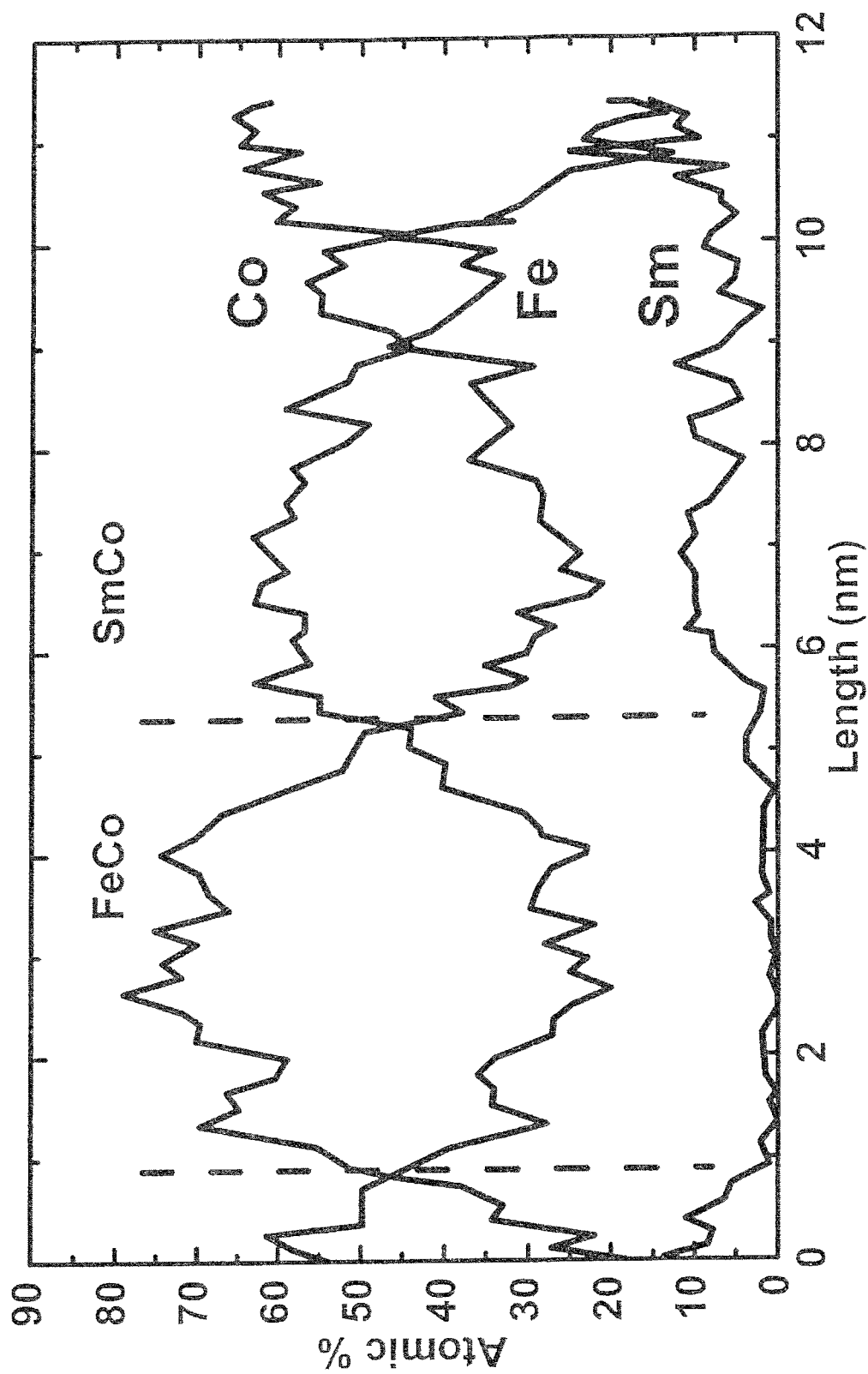
FIG. 30 is a graph of the composition profiles across the segment indicated in FIG. 29.
Figure 31:
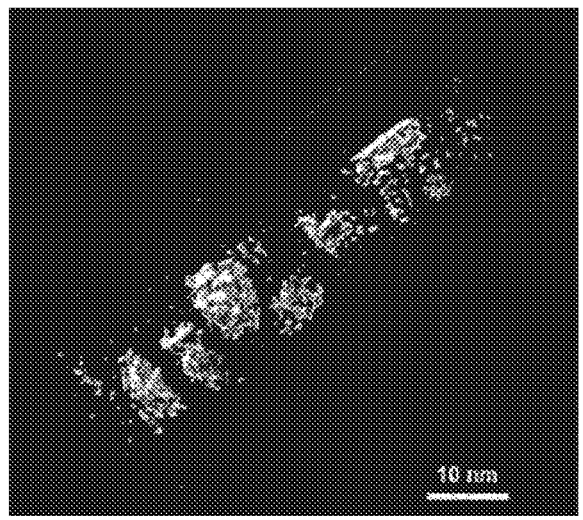
FIG. 31 is a depiction of a 60% Fe iso-concentration surface for a $SmCo_5$+20 wt. % Fe bulk magnetic nanocomposite.

To characterize the elemental composition distributions in the bulk nanocomposite magnets, 3-dimensional atom probe analysis was carried out for a $SmCo_5$+20 wt % Fe nanocomposite bulk magnet. A three dimensional (3D) atom map of Sm and Fe is shown in FIG. 29. The analyzed volume was 9×9×46 $nm^3$, in which more than five Fe-rich regions could be seen. The composition of the Fe-rich region was analyzed by choosing a box across the region, as shown in FIG. 29 (the box size =4×3×12 $nm^3$), and the composition profile along the length direction in FIG. 30 showed that such Fe-rich regions contain about 74±2 atom % Fe and 26±1 atom % Co. These Fe-rich particles were evident from the 60 atom % Fe iso-concentration surface, as shown in FIG. 31. They were formed from an initially pure α-Fe phase.

When a pre-alloyed FeCo soft magnetic component was used instead of a pure α-Fe component, the eventual composition of the soft component after the warm compaction reached ~$Fe_{65}Co_{35}$, which exhibited the highest magnetization among all the soft magnetic alloys. Bulk magnetic nanocomposites using this soft magnetic component exhibited further enhanced energy products. The $(BH)_{max}$ value of a $SmCo_5$+25wt % $Fe_{65}Co_{35}$ nanocomposite was 19.2 MGOe, which represents a 115% enhancement compared to the single phase $SmCo_5$ magnet produced under the same conditions (~9 MGOe). The FeCo alloy version also exhibited a 5% higher enhancement than the nanocomposite with pure α-Fe addition (18.3 MGOe).

Figure 32:
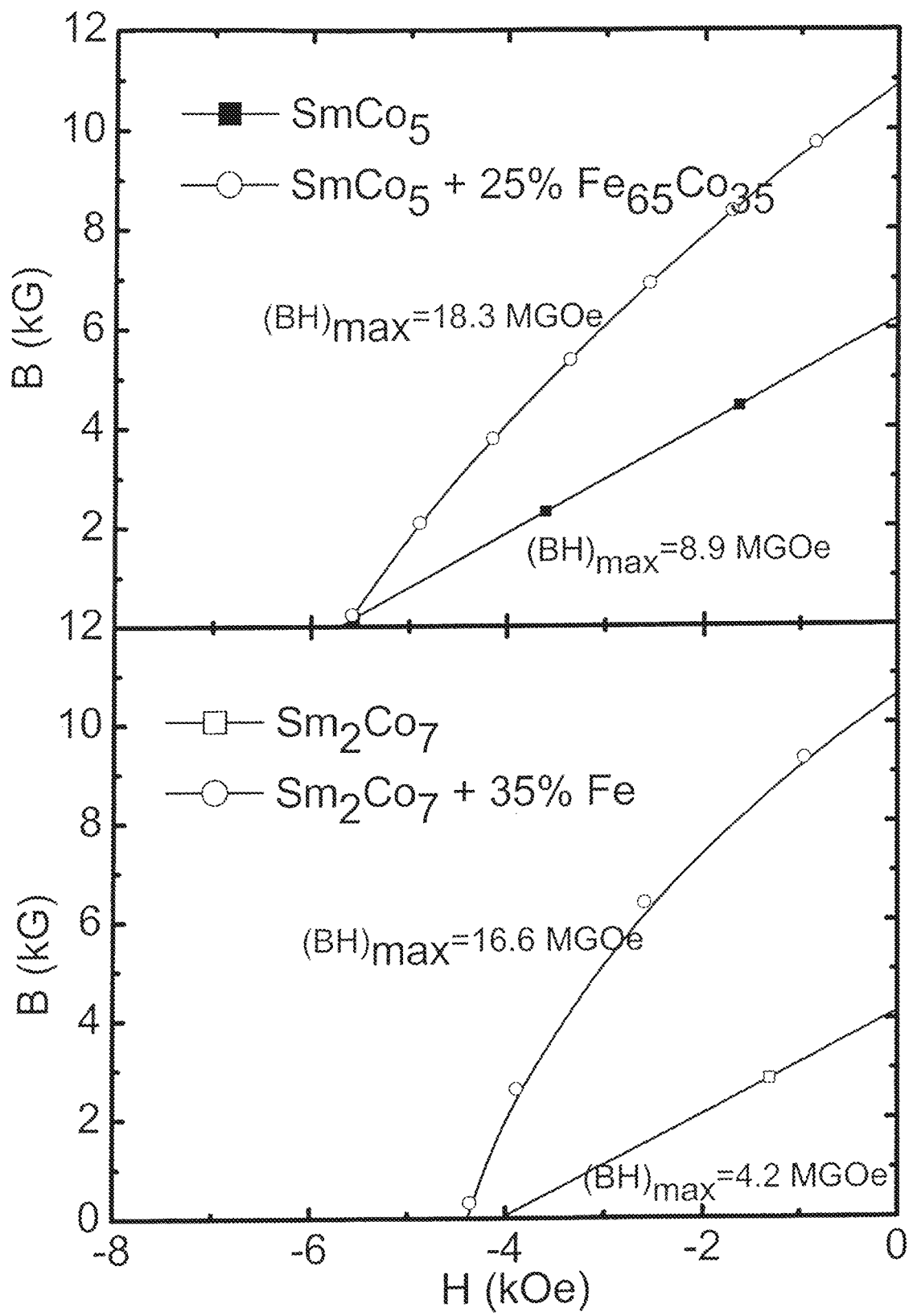
FIG. 32 consists of graphs showing the B—H curves of $SmCo_5$—$Fe_{65}Co_{35}$ and $Sm_2Co_7$—Fe bulk magnetic nanocomposites magnets with optimal energy products in comparison to their single-material counterparts.

Similar investigations were also carried out for $Sm_2Co_7$ and $Sm_2Co_{17}$-based nanocomposite systems. A more favorable situation was found in the $Sm_2Co_7$-based systems, where the energy product was as high as 17 MGOe at 35wt % Fe addition, which represents a ~300% enhancement compared to the single-phase counterpart (~4 MGOe). Not wishing to be bound by theory, it is believed that this energy product enhancement can be attributed to the fact that $Sm_2Co_7$ has relatively low magnetocrystalline anisotropy compared to $SmCo_5$. There is an anti-correlation between the hard-phase anisotropy constant and the critical soft-phase dimension. Thus, $Sm_2Co_7$-based composites are expected to "tolerate" more soft-phase and soft-phase agglomeration. FIG. 32 shows the energy product enhancement achieved in this work for the optimal $SmCo_5$—FeCo and $Sm_2Co_7$—Fe systems.

TABLE 1

Comparison of the magnetic properties of single-phase and composite magnets.

| Samples | Properties | | | |
|---|---|---|---|---|
| | $M_s$ (emu/g) | $M_r$ (emu/g) | $H_c$ (kOe) | $(BH)_{max}$ (MGOe) |
| $Sm_2Co_7$ | 47.0 | 38.1 | 42.7 | 4.0 |
| $Sm_2Co_7$ + 35% Fe | 144.3 | 83.1 | 5.2 | 16.6 |
| Enhancement | 101.4% | 118.1% | — | 315.0% |
| $SmCo_5$ | 73.3 | 57.9 | 29.5 | 8.9 |
| $SmCo_5$ + 25% Fe | 125.7 | 87.3 | 6.7 | 18.3 |
| Enhancement | 71.5% | 50.8% | — | 105.6% |

Figure 33:
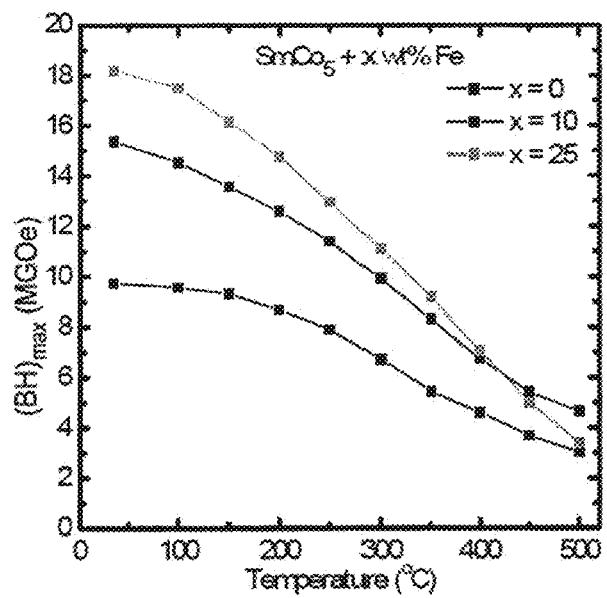
FIG. 33 is a graph showing the temperature dependence of the energy product of a series of bulk magnetic nanocomposites.

FIG. 33 shows the energy product of various bulk magnetic nanocomposites at temperatures up to 500° C. The nanocomposite magnets exhibited energy products greater than 10 MGOe at 300° C., which was equivalent to about 60% of the room temperature value. The ability of a magnetic material to maintain its energy product at elevated temperatures is a measure of the material's thermal stability.

Example 3

Figure 36:
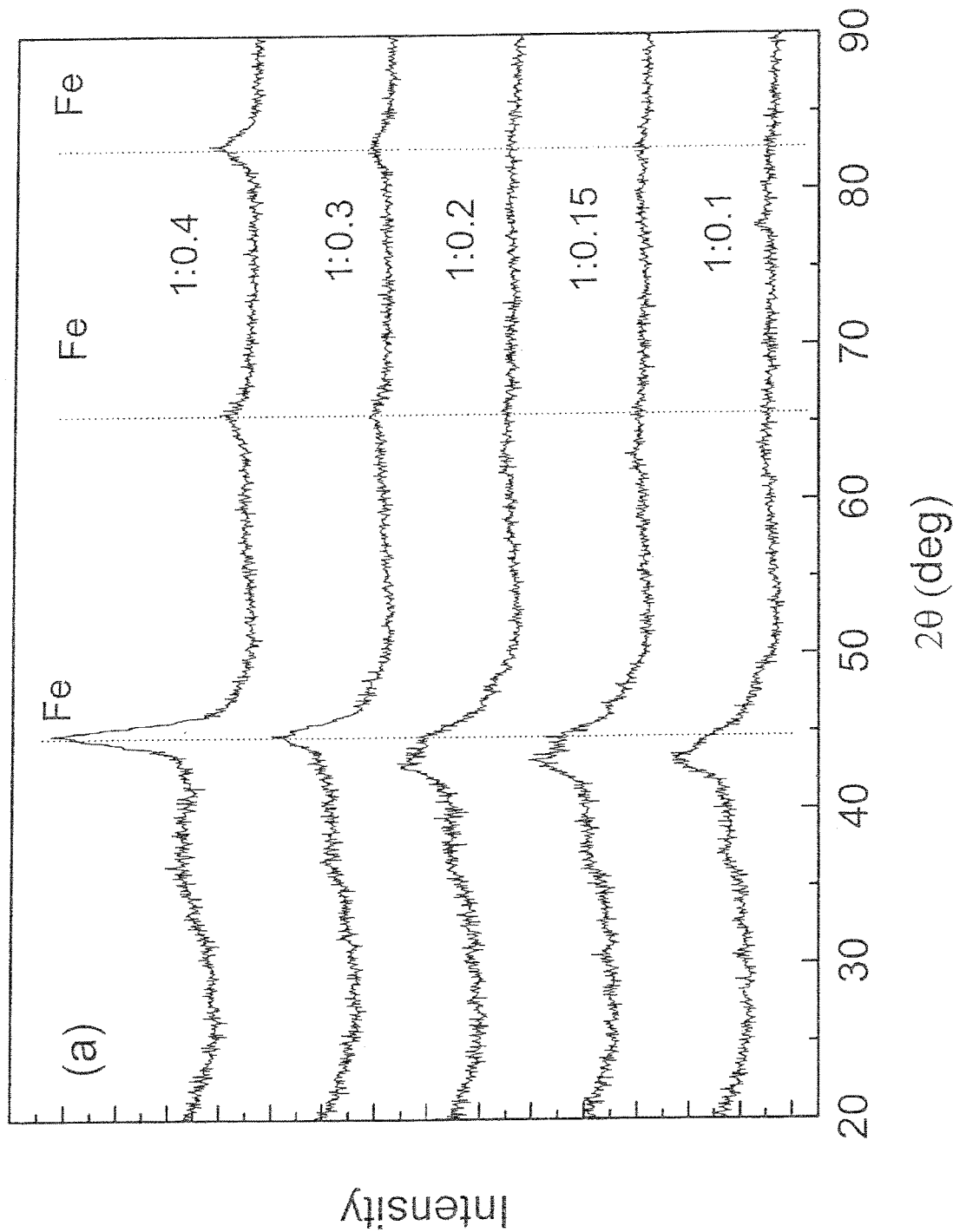
FIG. 36 is a series of x-ray diffraction patterns.
Figure 37:
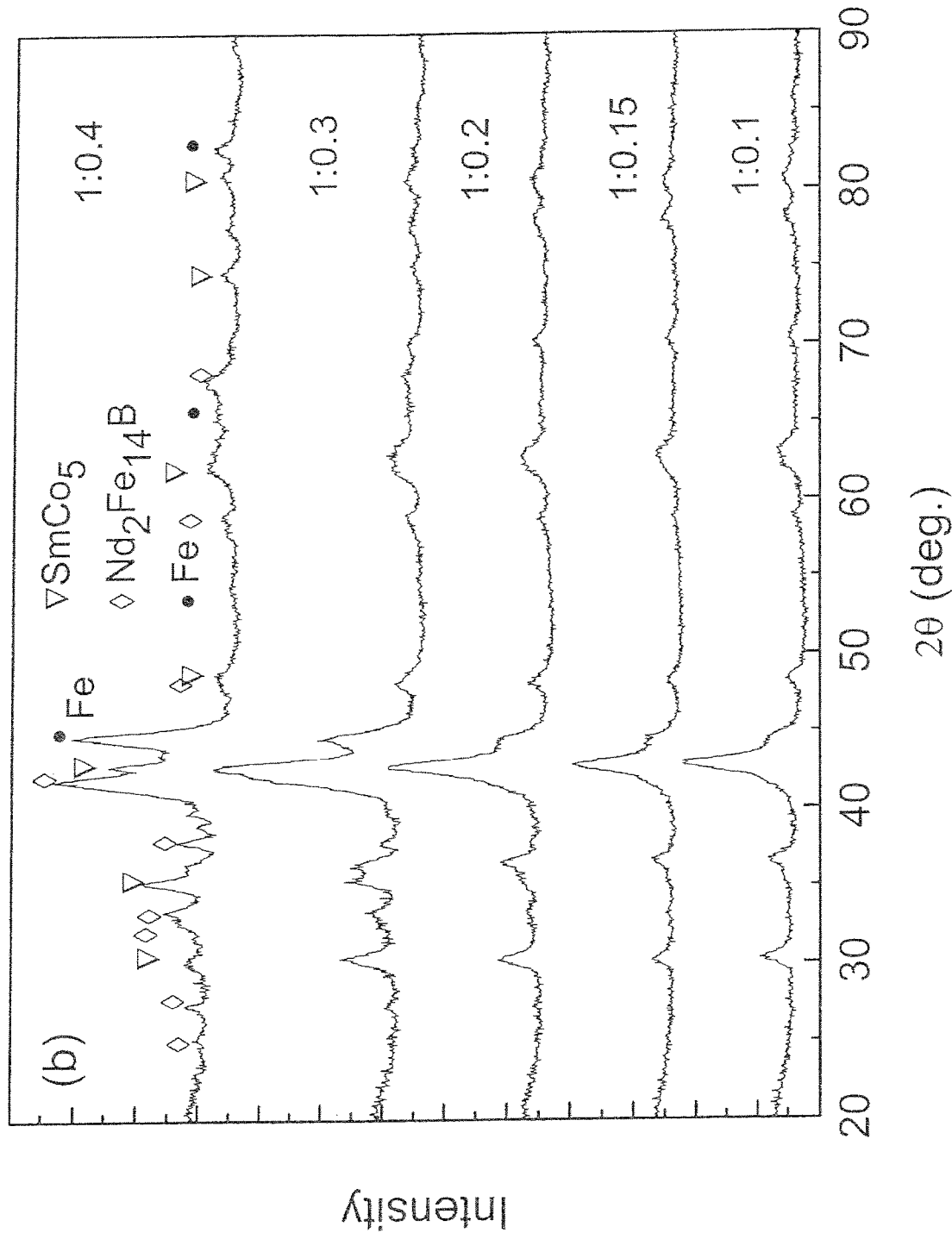
FIG. 37 is a series of x-ray diffraction patterns.
Figure 38:
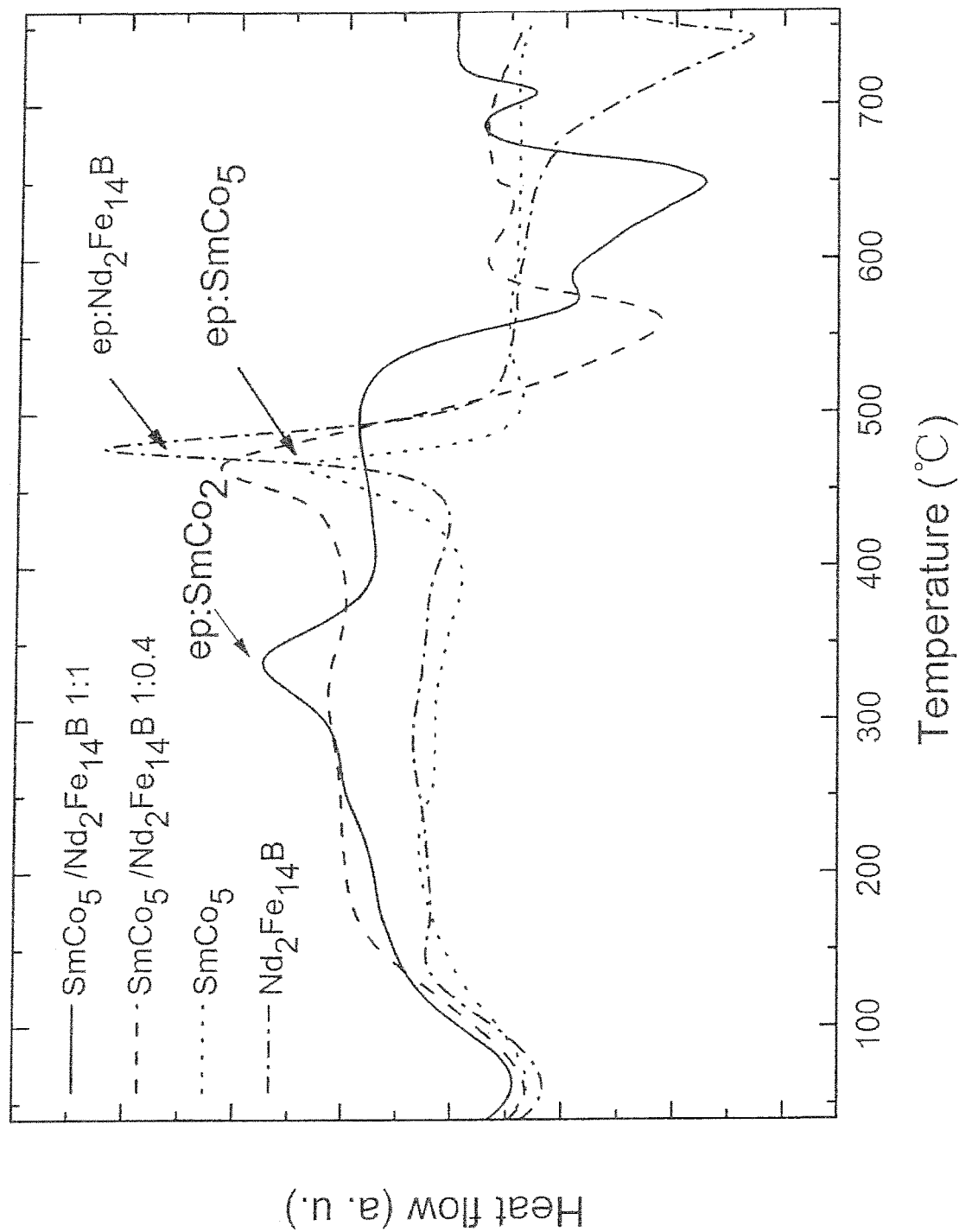
FIG. 38 shows a series of Differential Scanning calorimetry (DSC) measurements of separated hard phases and hard-hard composite samples (hybrid magnets). The DSC curves indicate the various materials' crystallization temperatures during heating.
Figure 39:
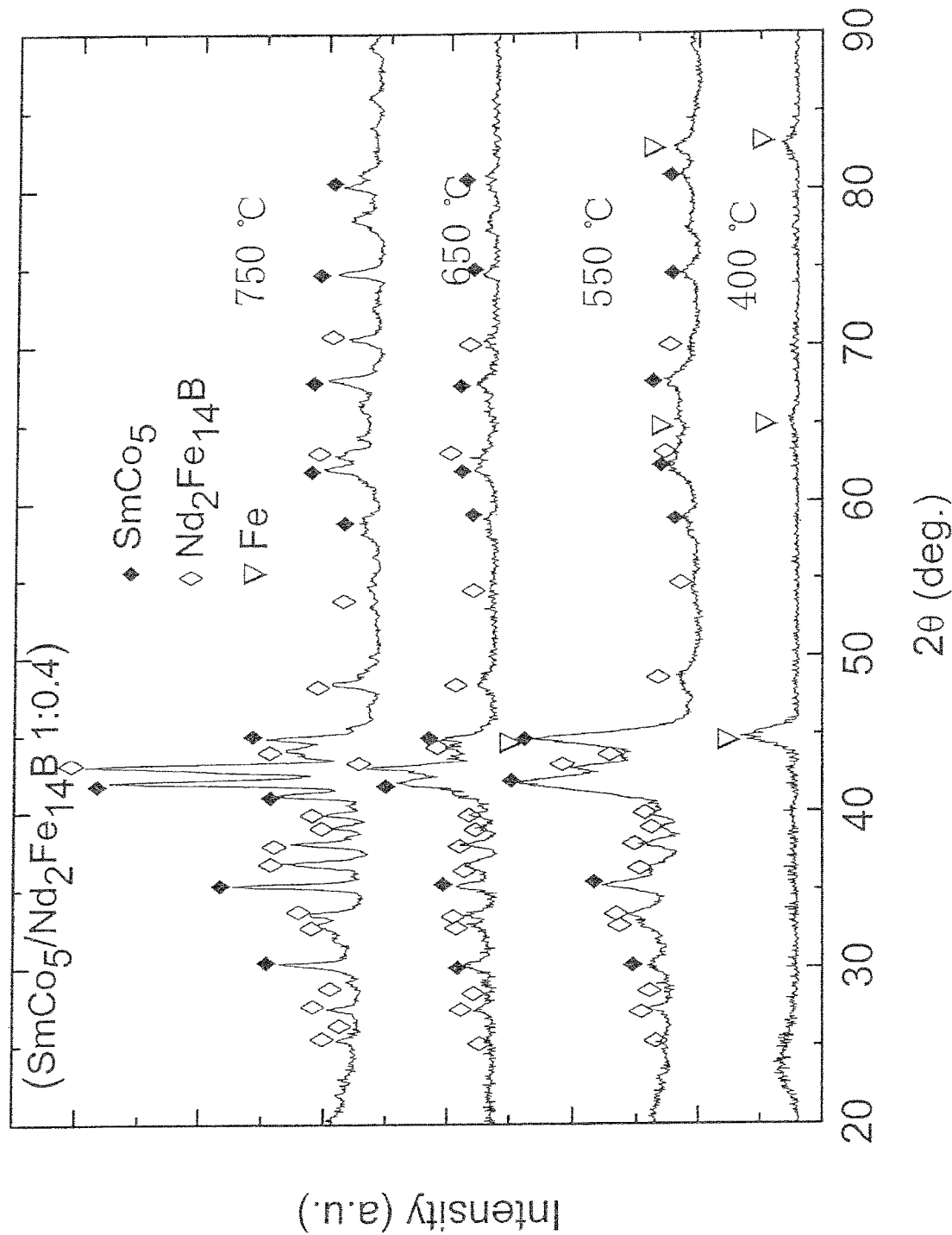
FIG. 39 shows a series of XRD patterns of the $SmCo_5$—$Nd_2Fe_{14}B$ composite magnet with a ratio of 1:0.4, and indicates the formation of the two hard phases.
Figure 40:
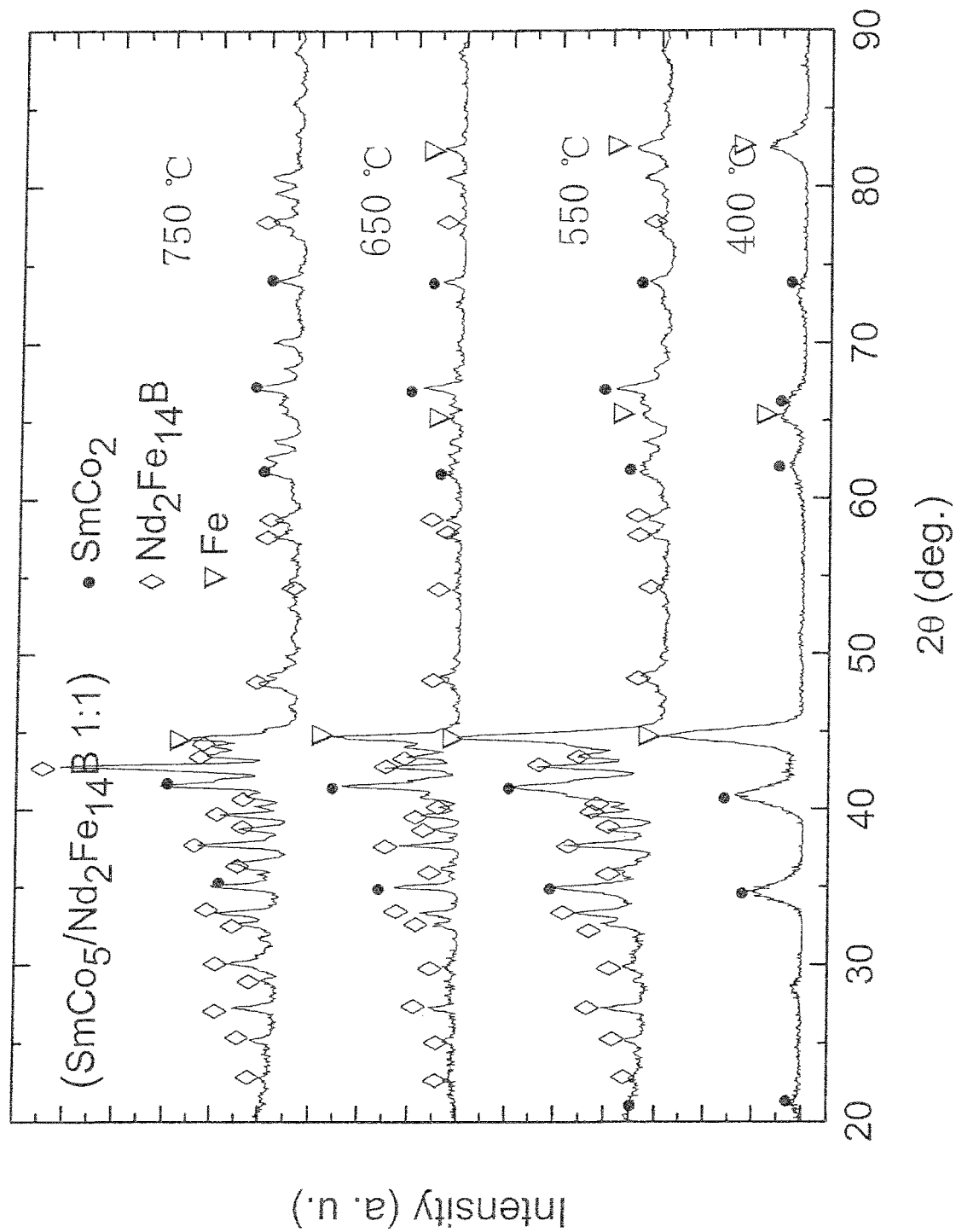
FIG. 40 shows a series of is XRD patterns of the $SmCo_5$—$Nd_2Fe_{14}B$ composite magnets with a ratio of 1:1, and indicates the formation of $Nd_2Fe_{14}B$ and undesired SmCo2 phase.
Figure 41:
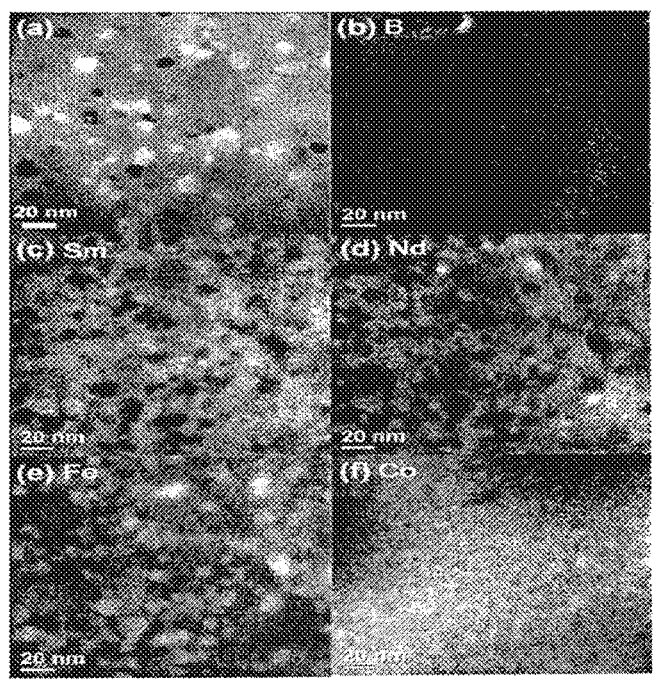
FIG. 41 is a series of TEM and EFTEM images of a hard-hard bulk magnetic nanocomposite.
Figure 42:
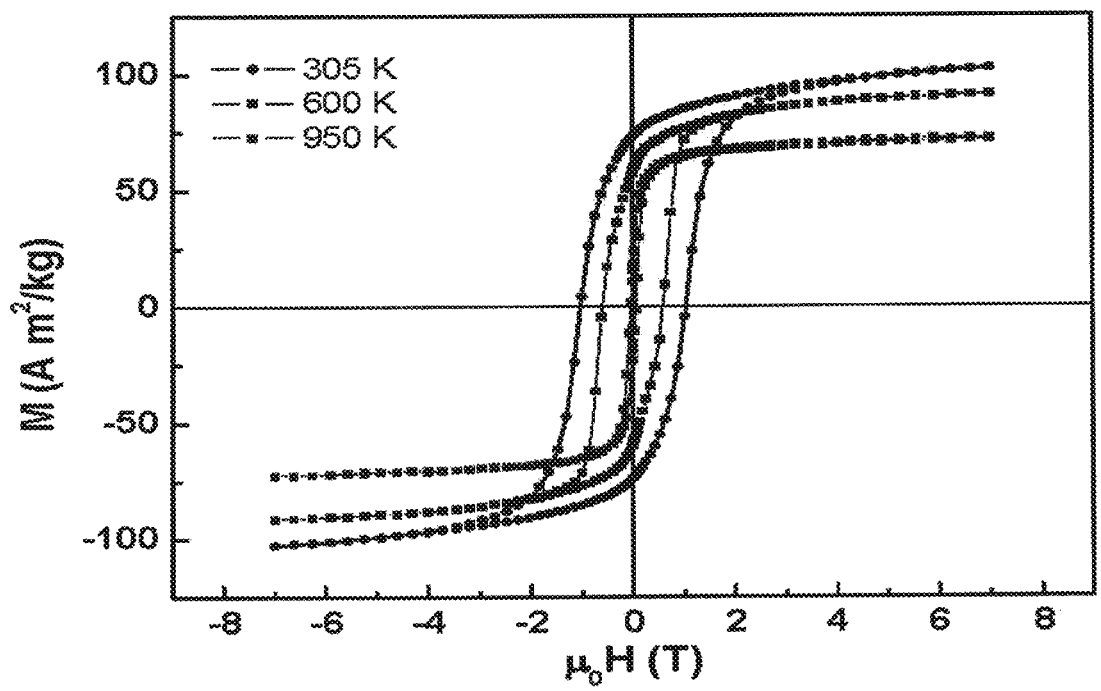
FIG. 42 is a graph showing hysteresis loops of a hard-hard bulk magnetic nanocomposite measured at different temperatures.
Figure 43:
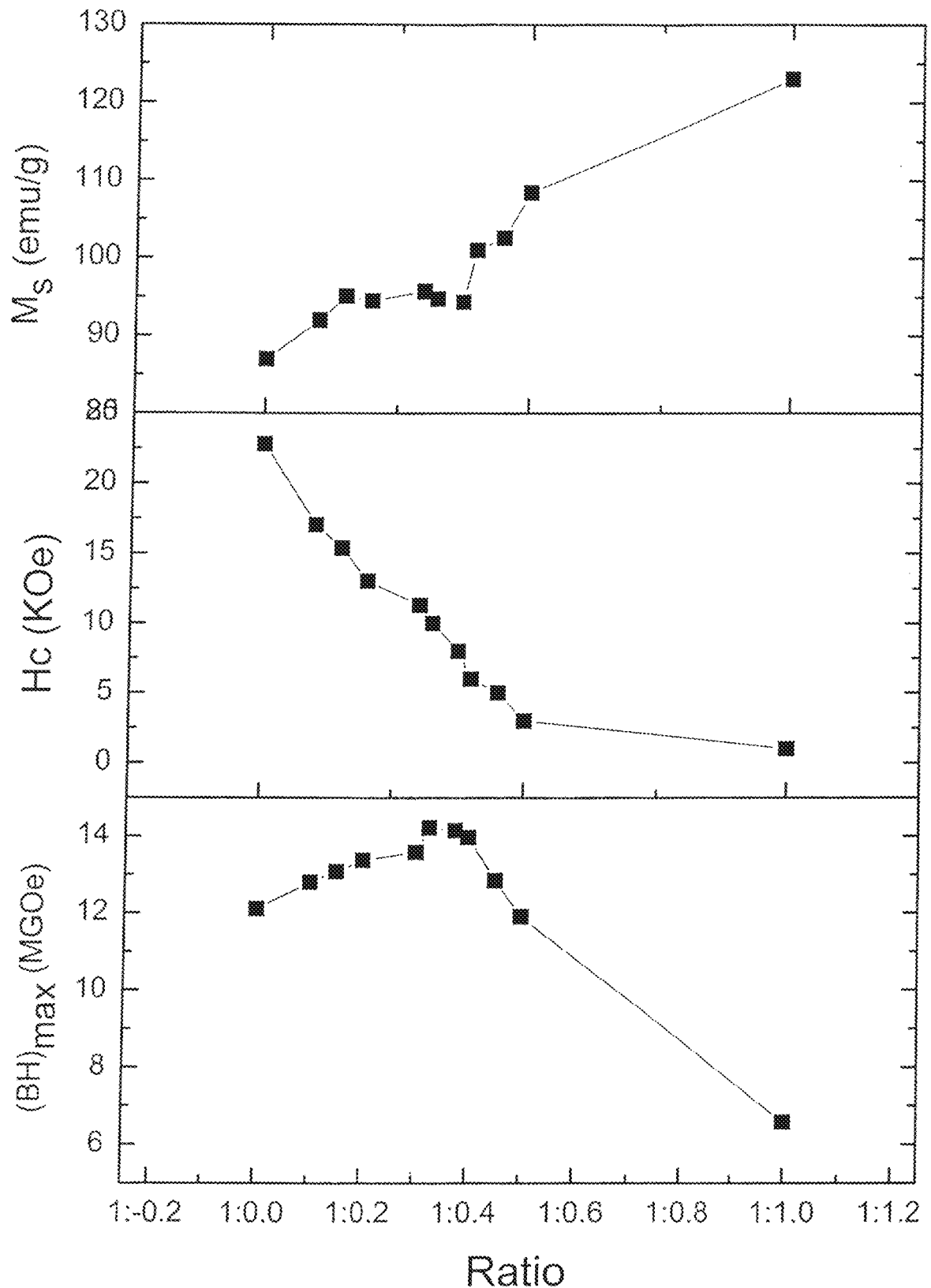
FIG. 43 is a series of graphs showing various magnetic properties of a bulk magnetic nanocomposite as a function of weight ratios of the magnetic components.
Figure 44:
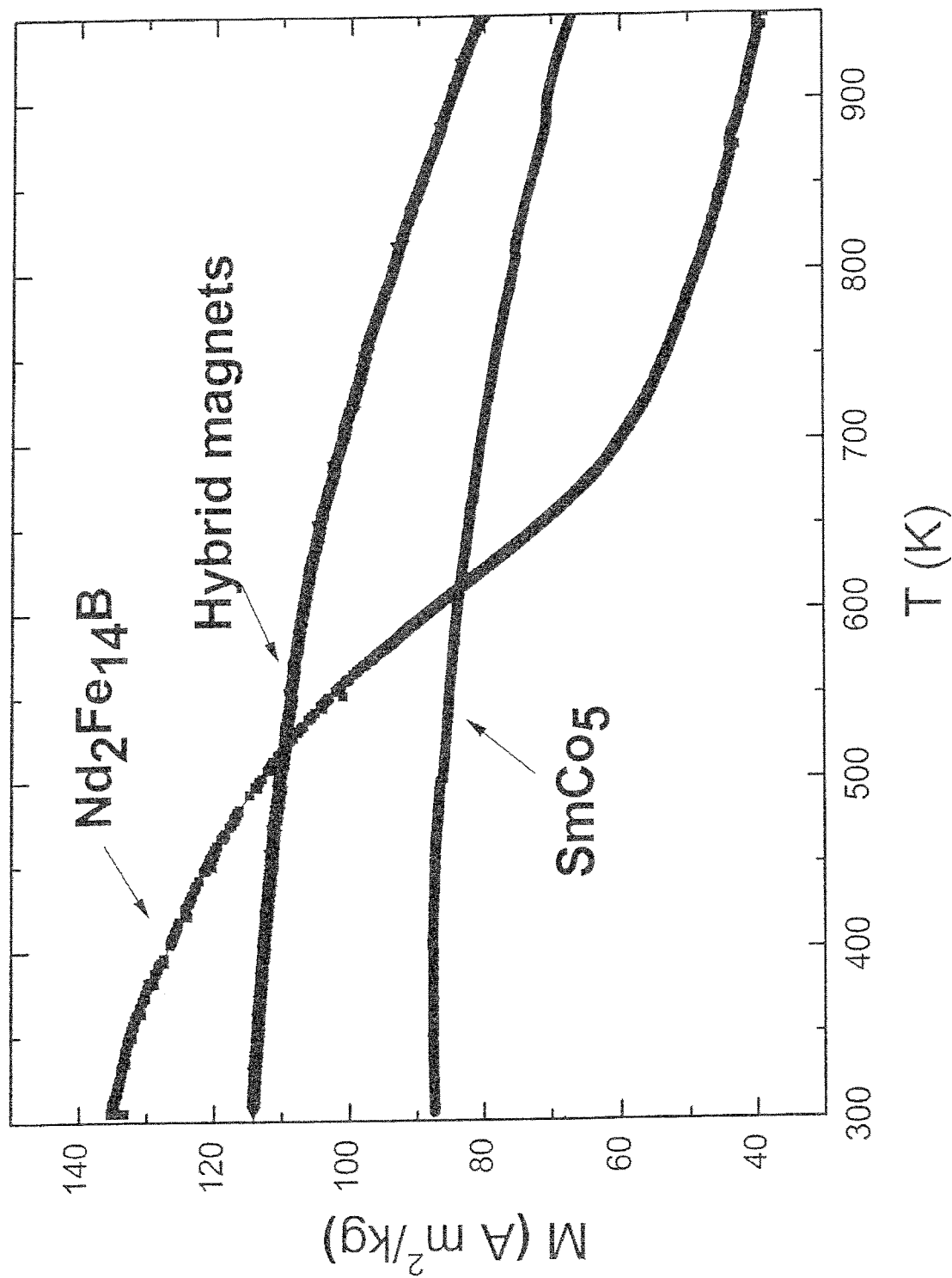
FIG. 44 shows a series of temperature-dependent magnetization curves for various magnetic materials.
Figure 45:
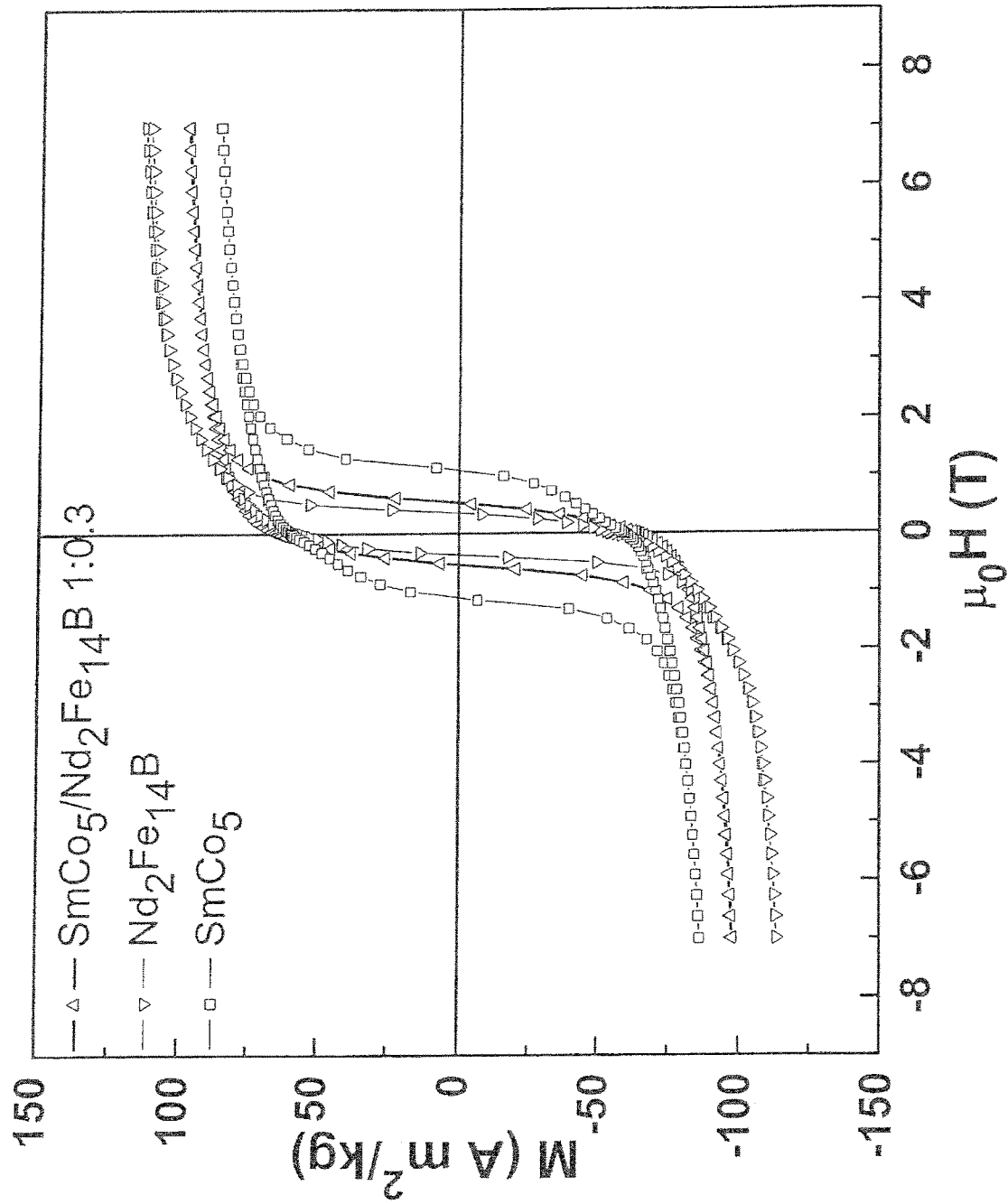
FIG. 45 shows hysteresis loops for various magnetic materials.
Figure 46:
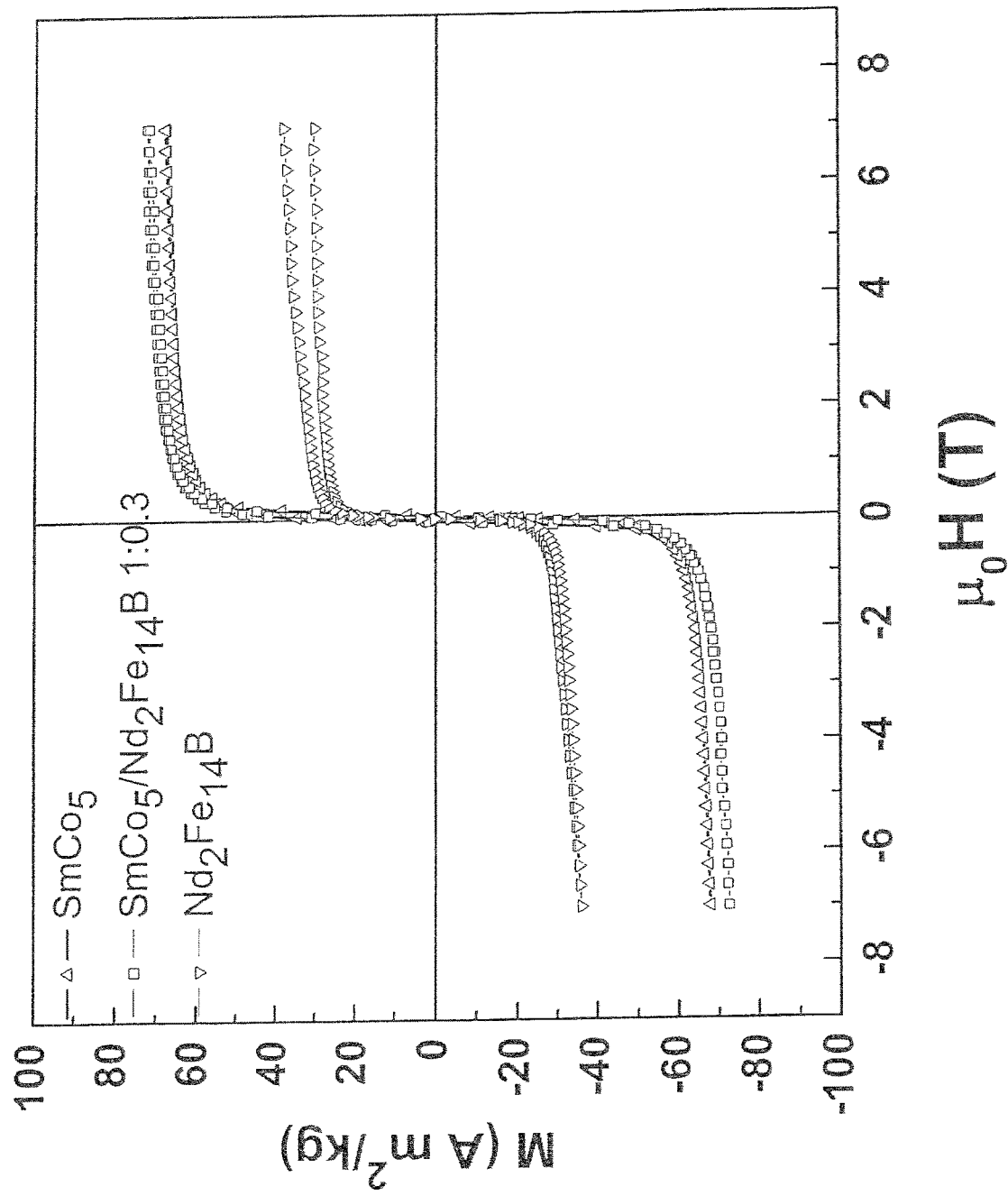
FIG. 46 shows hysteresis loops for various magnetic materials at 500K.

This example demonstrates, inter alia, the versatility and modularity of some methods of the present invention. The following procedures were carried out to form a bulk magnetic nanocomposite that that comprises a matrix comprising at least one first hard magnetic component, and a plurality of particles comprising at least one second hard magnetic component, wherein the plurality of particles comprising at least one second hard magnetic component are distributed in the matrix comprising at least one first hard magnetic component. The at least one first hard magnetic component was $SmCo_5$. The at least one second hard magnetic component was $Nd_2Fe_{14}B$. The two starting material powders (consisting essentially of the first and second hard magnetic components, respectively) had an initial particle size of about 10-40 μm. The two powders were combined and ball milled for four hours and then annealed at 550° C. for 30 minutes. FIGS. 36 and 37 show x-ray diffraction patterns of a series of processed mixtures having different ratios of first and second hard magnetic components after ball milling and annealing, respectively. The processed mixtures were then warm compacted in accordance with the disclosure herein. FIG. 41 shows a series of TEM and EFTEM images of a composite having a 1 to 0.4 ratio of $SmCo_5$ to $Nd_2Fe_{14}B$. FIGS. 42 and 43 show some magnetic properties of such "hard-hard" bulk magnetic nanocomposites as a function of warm compacting temperature and ratio of first and second hard magnetic components. FIGS. 44-46 show some magnetic properties of hard-hard bulk magnetic nanocomposites compared to the single phases $SmCo_5$ and $Nd_2Fe_{14}B$. The data indicated that methods of the present invention can be used to prepare hard-hard bulk magnetic nanocomposites having various properties such as enhanced magnetization (compared to $SmCo_5$), enhanced thermal stability (compared to $Nd_2Fe_{14}B$), enhanced energy product (16% higher than that of pure $SmCo_5$ magnets), and a Curie temperature higher than 950K.

Desirable characteristics that can be exhibited by various but not necessarily all embodiments of the present invention can include, but are not limited to, the following: providing bulk permanent magnets capable of delivering high power density at elevated temperatures (useful, for example, in axial field permanent magnet motors for quiet undersea vehicles, centrifugal pumps, and in generator gear boxes for wind turbines); providing bulk permanent magnets having desirable characteristics at reduced cost (e.g., by replacing expensive components such as cobalt and rare earth materials such as Sm and Nd with less expensive components such as α-Fe); providing bulk permanent magnets having enhanced energy products; providing simple and modular methods of making bulk permanent magnets.

Various embodiments of the invention have been described in fulfillment of the various objectives of the invention. It should be recognized that these embodiments are merely illustrative of the principles of the present invention. Numerous modifications and adaptations thereof will be readily apparent to those of skill in the art without departing from the spirit and scope of the invention.

I claim:

1. A bulk magnetic nanocomposite comprising:
   a matrix comprising at least one hard magnetic component, and
   a plurality of particles comprising at least one soft magnetic component,
   wherein the plurality of particles comprising at least one soft magnetic component are homogeneously distributed in the matrix comprising at least one hard magnetic component, the homogeneously distributed particles being uniformly dispersed in the hard magnetic component, and the plurality of particles are no larger than about 20 nm in at least one dimension.

2. The bulk magnetic nanocomposite of claim 1, wherein substantially all of the plurality of particles comprising at least one soft magnetic component are no larger than a critical size in at least one dimension.

3. The bulk magnetic nanocomposite of claim 1, wherein substantially all of the plurality of particles comprising at least one soft magnetic component are no larger than about 10 nm in at least one dimension.

4. The bulk magnetic nanocomposite of claim 1, wherein the at least one hard magnetic component is a brittle material and the at least one soft magnetic component is a ductile material.

5. The bulk magnetic nanocomposite of claim 1, wherein the at least one hard magnetic component is selected from the group consisting of $SmCo_3$, $SmCo_5$, $SmCo_7$, $Sm_2Co_7$, $Nd_2Fe_{14}B$, and FePt and mixtures thereof.

6. The bulk magnetic nanocomposite of claim 1, wherein the at least one hard magnetic component is $SmCo_5$ or $Sm_2Co_7$.

7. The bulk magnetic nanocomposite of claim 1, wherein the at least one soft magnetic component is selected from the group consisting of a-Fe, FeCo alloys, $Fe_4N$, $Fe_8N$, FeB, and FeNi alloys and mixtures thereof.

8. The bulk magnetic nanocomposite of claim 1, wherein the at least one soft magnetic component is α-Fe or an FeCo alloy.

9. The bulk magnetic nanocomposite of claim 1, wherein the at least one hard magnetic component is $SmCo_5$ or $Sm_2Co_7$ and the at least one soft magnetic component is α-Fe or an FeCo alloy.

10. The bulk magnetic nanocomposite of claim 1, wherein the plurality of particles comprising at least one soft magnetic component is present in an amount from about 1 to about 35 weight percent of the matrix comprising at least one hard magnetic component.

11. The bulk magnetic nanocomposite of claim 1, wherein the bulk magnetic nanocomposite exhibits an enhanced energy product compared to an analogous bulk magnetic material that does not comprise a plurality of particles comprising at least one soft magnetic component distributed in the matrix comprising at least one hard magnetic component.

12. The bulk magnetic nanocomposite of claim 11, wherein the enhanced energy product is at least about 50 percent greater than the energy product exhibited by an analogous bulk magnetic material that does not comprise a plurality of particles comprising at least one soft magnetic component distributed in the matrix comprising at least one hard magnetic component.

13. The bulk magnetic nanocomposite of claim 11, wherein the enhanced energy product is at least about 100 percent greater than the energy product exhibited by an analogous bulk magnetic material that does not comprise a plurality of particles comprising at least one soft magnetic component distributed in the matrix comprising at least one hard magnetic component.

14. The bulk magnetic nanocomposite of claim 11, wherein the enhanced energy product is at least about 200 percent greater than the energy product exhibited by an analogous bulk magnetic material that does not comprise a plurality of particles comprising at least one soft magnetic component distributed in the matrix comprising at least one hard magnetic component.

15. The bulk magnetic nanocomposite of claim 11, wherein the enhanced energy product is at least about 300 percent greater than the energy product exhibited by an analogous bulk magnetic material that does not comprise a plurality of particles comprising at least one soft magnetic component distributed in the matrix comprising a hard magnetic component.

16. The bulk magnetic nanocomposite of claim 1, wherein the bulk magnetic nanocomposite exhibits an energy product at about 300° C. that is at least about 60 percent of the energy product exhibited by the bulk magnetic nanocomposite at room temperature.

* * * * *